(12) United States Patent
Counterman

(10) Patent No.: US 8,893,244 B2
(45) Date of Patent: Nov. 18, 2014

(54) APPLICATION-BASED CREDENTIAL MANAGEMENT FOR MULTIFACTOR AUTHENTICATION

(75) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 13/307,107

(22) Filed: Nov. 30, 2011

(65) Prior Publication Data

US 2013/0139235 A1    May 30, 2013

(51) Int. Cl.
*H04L 29/06* (2006.01)

(52) U.S. Cl.
CPC ........... *H04L 63/061* (2013.01); *H04L 2209/80* (2013.01)
USPC .................................. 726/7; 713/168; 380/44

(58) Field of Classification Search
CPC ... H04L 63/08; H04L 63/061; H04L 2209/80; H04W 12/06
USPC ........................ 726/5–7, 21; 713/168; 380/44
See application file for complete search history.

(56) References Cited

U.S. PATENT DOCUMENTS

| 4,797,920 | A  | * | 1/1989  | Stein        | 705/72  |
| 2005/0287990 | A1 | * | 12/2005 | Mononen et al. | 455/411 |
| 2008/0301785 | A1 | * | 12/2008 | Beyer et al. | 726/5   |

\* cited by examiner

*Primary Examiner* — Hadi Armouche
*Assistant Examiner* — Dao Ho

(57) ABSTRACT

A device receives a request to authenticate an end user of a user device to use an application, based on an application identifier and a user identifier included the request, and determines whether the application is authenticated based on the application identifier. The device also determines whether the user device is authenticated based on the user identifier and utilizing a generic bootstrapping architecture (GBA) authentication procedure, and determines whether the end user is authenticated based on a personal identification number (PIN) associated with the end user. The device further provides, to an application server device hosting the application, results of the authentications of the application, the user device, and the end user.

16 Claims, 16 Drawing Sheets

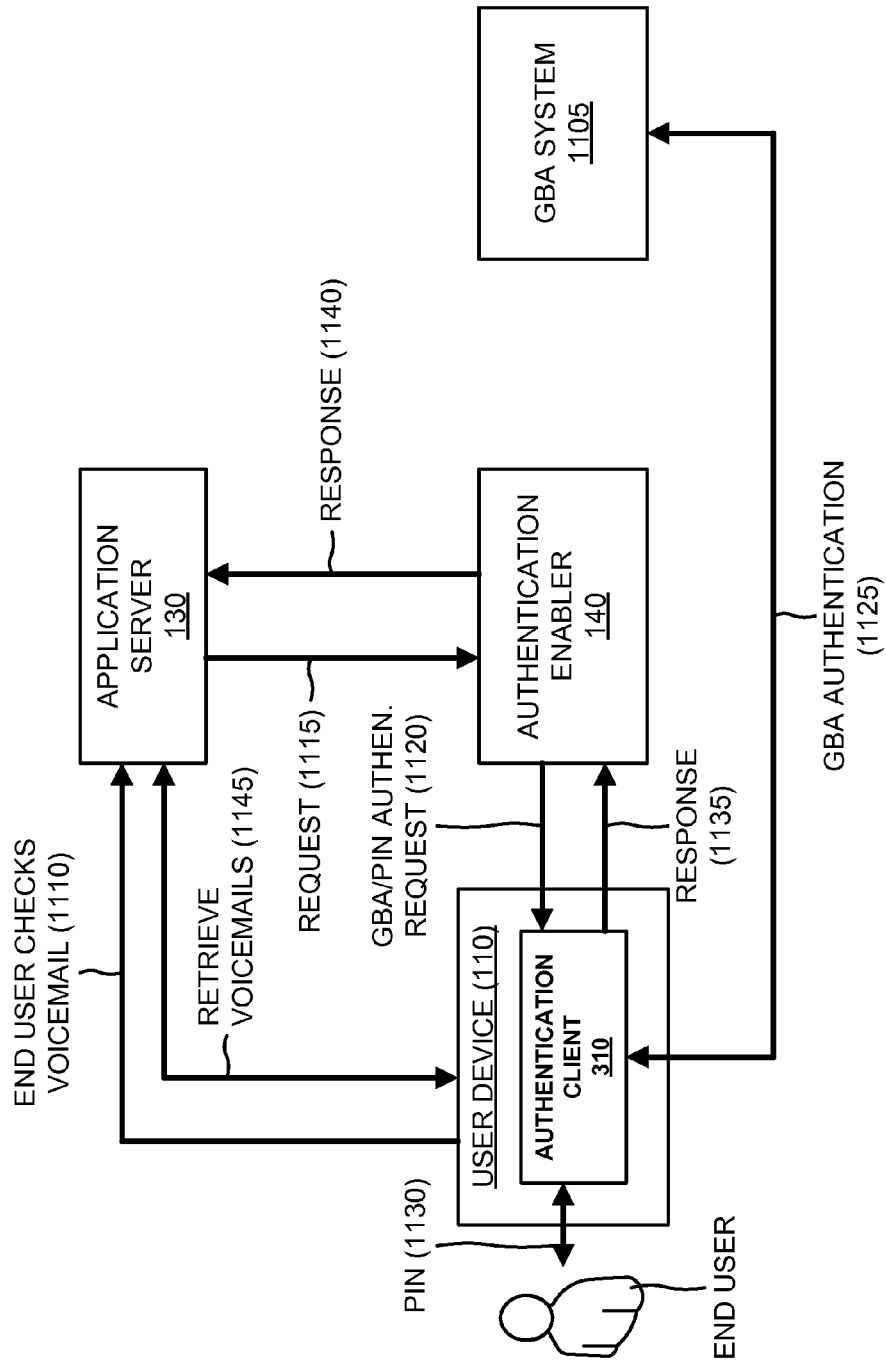

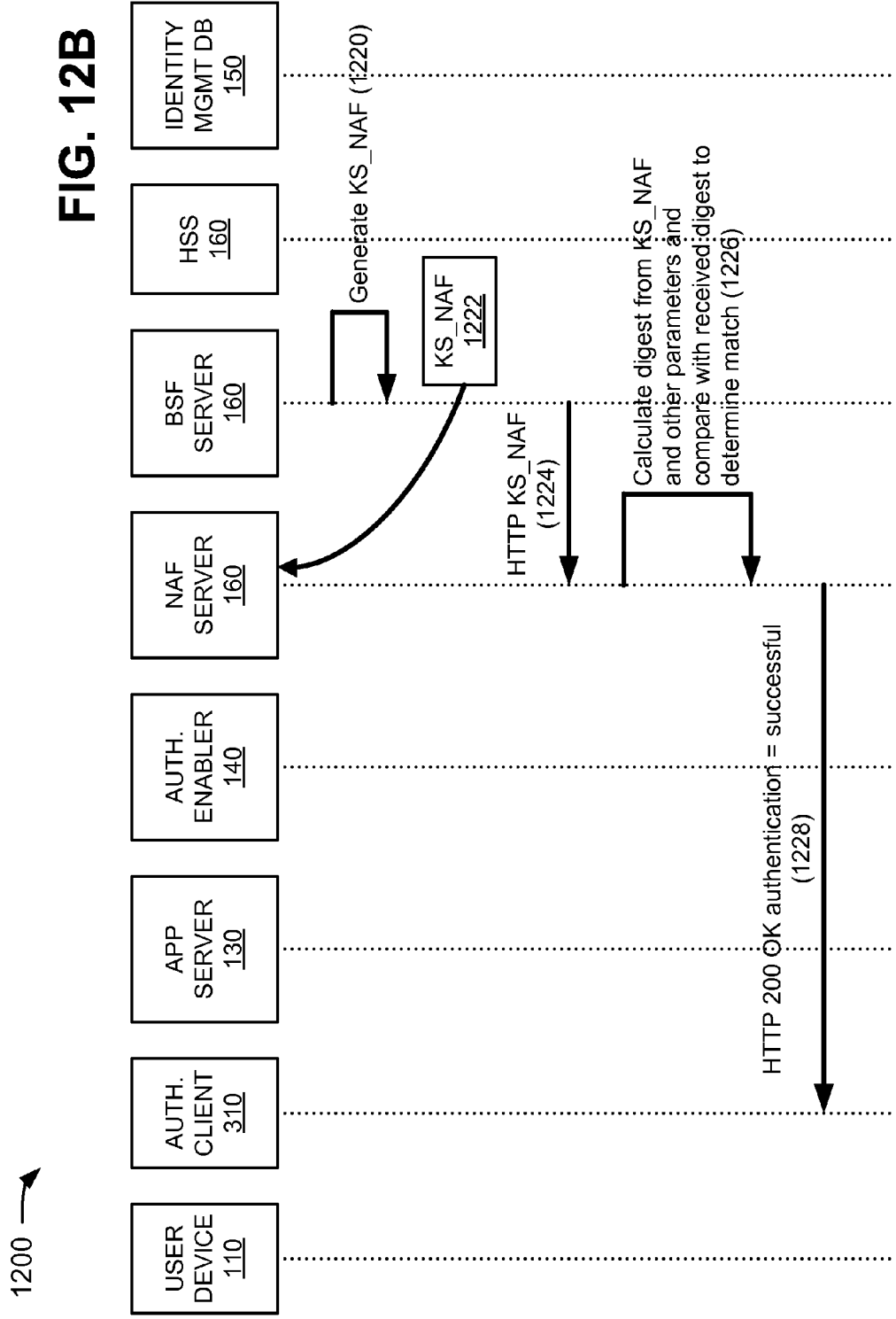

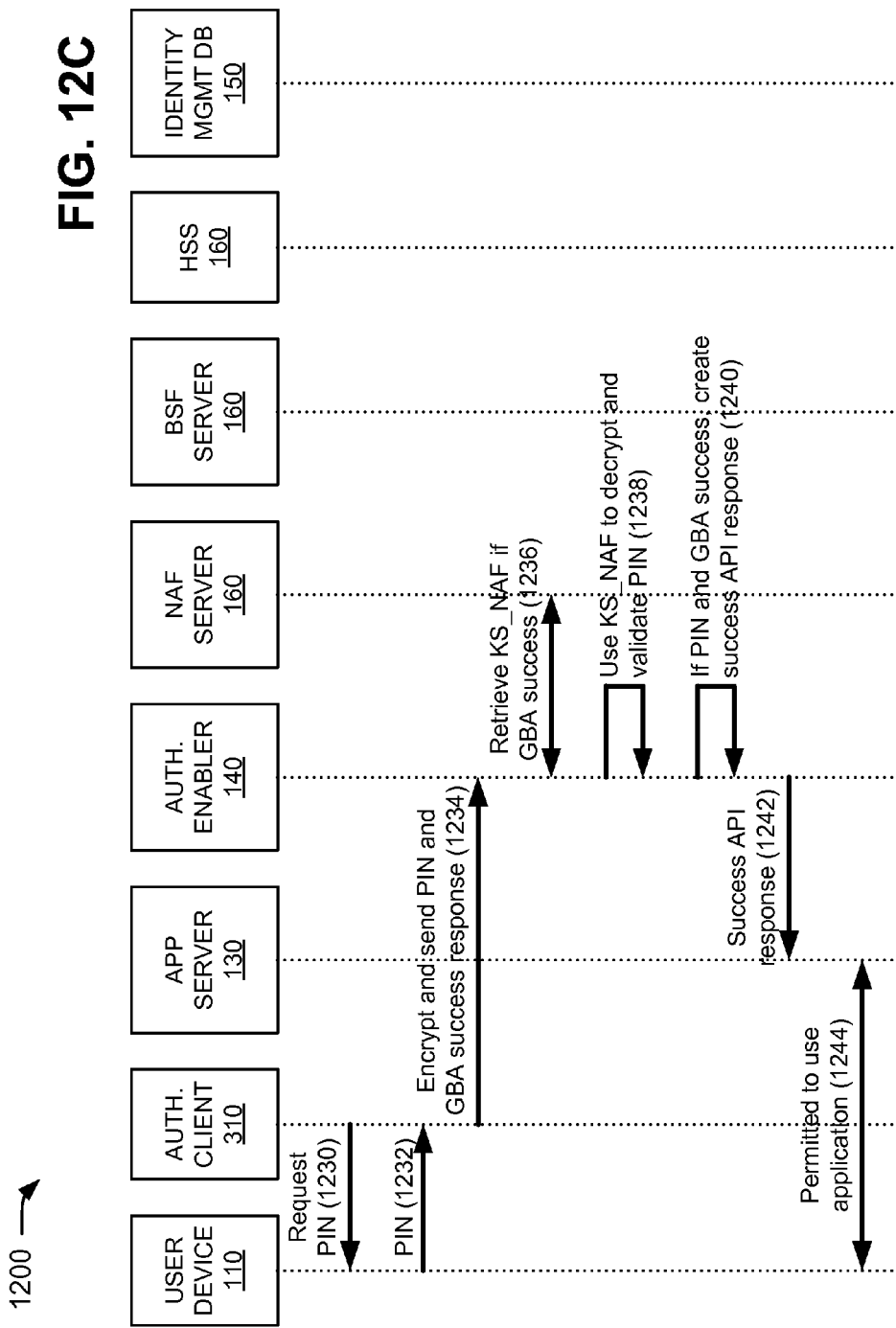

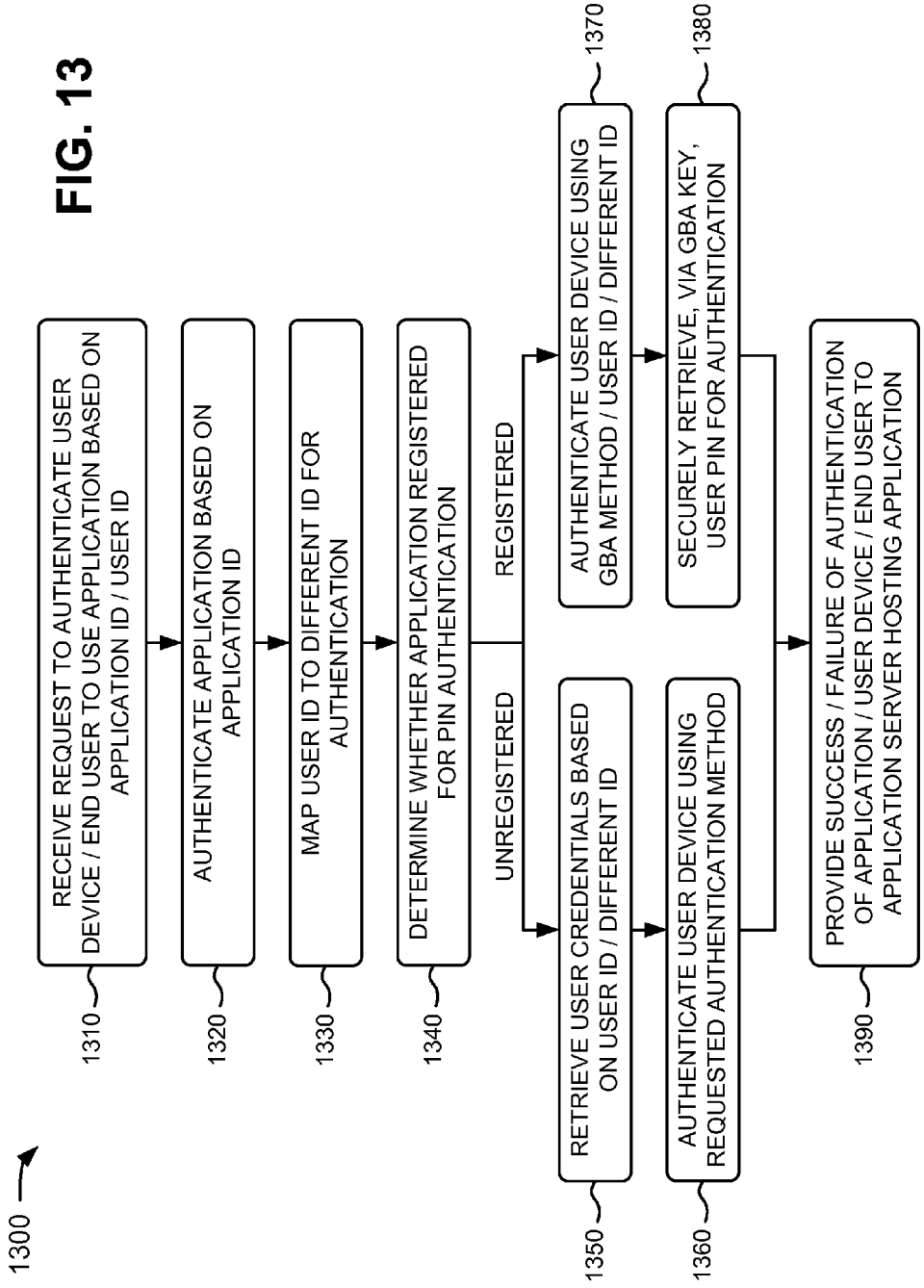

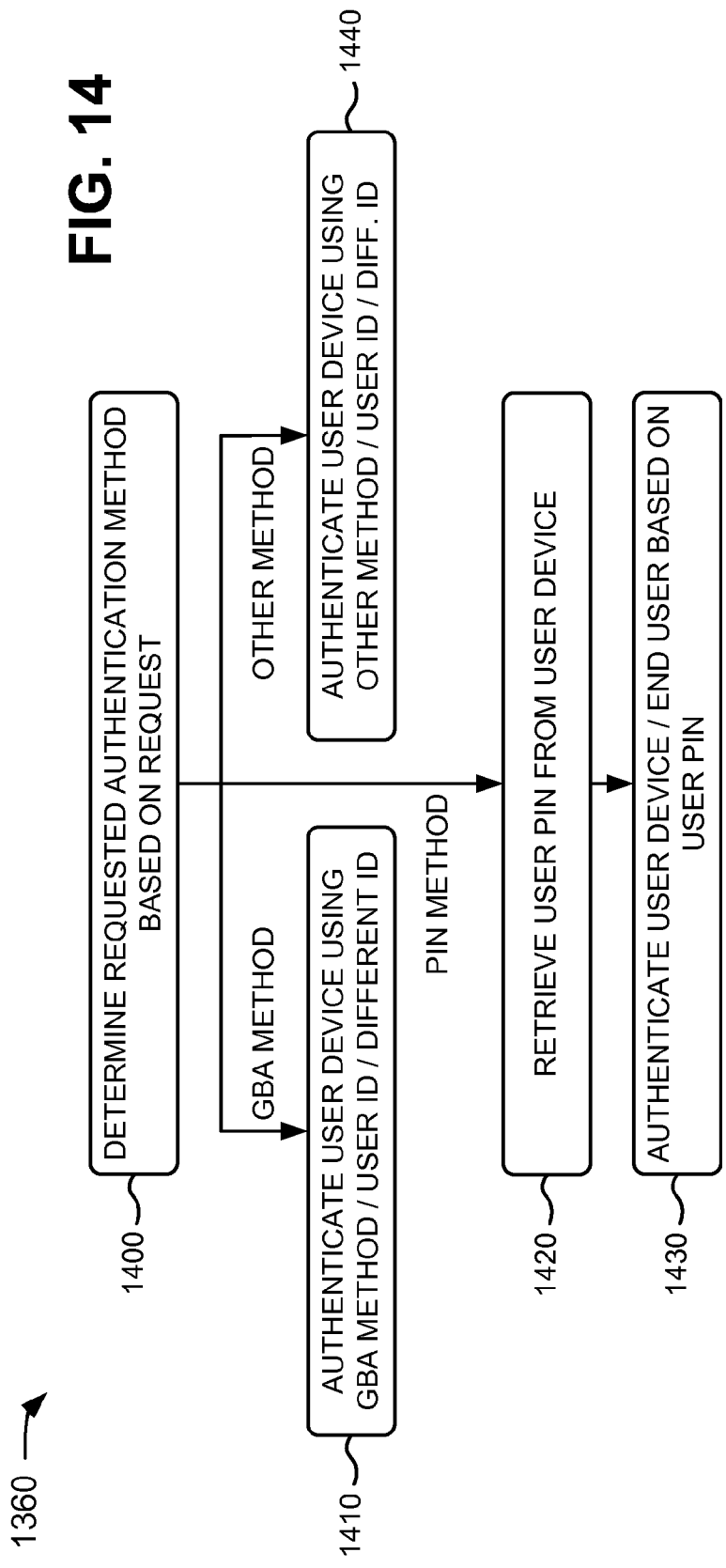

APPLICATION-BASED CREDENTIAL MANAGEMENT FOR MULTIFACTOR AUTHENTICATION

BACKGROUND

A service provider is an entity (e.g., a business or an organization) that sells bandwidth of or access to a network (e.g., the Internet, a data network, a telecommunication network, etc.) associated with the service provider. Service providers may include telecommunications companies, data carriers, wireless communications providers, Internet service providers, cable television operators offering high-speed Internet access, etc. Service provider networks enable third party application developers to create applications that use network resources, such as location systems that determine locations of mobile communication devices. These applications make requests to a network device, such as a gateway. The network device processes the requests and sends the requests to service provider systems that provide services, such as determining the locations of mobile communication devices, messaging, and/or other services. Such service provider systems may be referred to as enablers.

The service provider network defines application programming interfaces (APIs) for third party application developers to access the capabilities of enablers in the service provider network. A third party application often needs to authenticate a person (i.e., an end user) using the third party application, and often provides some form of authentication of the end user. However, in many cases, it is preferable to have the service provider network perform this function on behalf of the third party application. For example, if a developer would like the service provider to bill for an end user's use of their application, the service provider network needs to authenticate the end user of the application. The third party application not only needs to identify the end user, but also needs to receive a level of assurance for that identification. The end user, the application, and the service provider network need to form trust relationships. However, the APIs provided for the third party applications often do not provide an identifier for end users using the third party applications, making authentication of such end users very difficult.

BRIEF DESCRIPTION OF THE DRAWINGS

FIG. 11 is a diagram of example voicemail authentication operations capable of being performed by an example portion of the network of FIG. 1;

FIGS. 12A-12C are flow diagrams of example PIN and generic bootstrapping architecture (GBA) based authentication operations capable of being performed by an example portion of the network of FIG. 1; and FIGS. 13 and 14 are flow charts of an example process for authenticating a user device, an end user, and/or an application according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide application-initiated user authentication for applications provided by a cloud computing environment (e.g., by a service provider) and/or by a device, such as a mobile computation and/or communication device. The systems and/or methods may provide applications with a resilient user authentication mechanism, such as a user personal identification number (PIN). In one example implementation, a name or an identity of an application providing an authentication request may be used to determine how to access credentials for an authentication method required by the request. A user PIN may permit the application, requesting authentication, to authenticate a user of the application with a specific authentication request.

The systems and/or methods may provide a multifactor authentication process for a user utilizing a user device to access an application. For example, the systems and/or methods may first authenticate the application to be accessed by the user device. The systems and/or methods may then authenticate the user device using a particular authentication method, such as the GBA authentication method. The GBA authentication method may generate a shared key that may be used to protect user-provided data, such as a user PIN, a user name and/or password, etc. Finally, the systems and/or methods may authenticate the user with the user-provided data.

The systems and/or methods may determine user credentials for user authentication based on a name or identity of an application (e.g., an application identifier) and an application service provider. Alternatively, or additionally, the user credentials may be retrieved from the application service provider and/or an entity that manages user credentials. Alternatively, or additionally, the user credentials may be retrieved based on an authentication method specified in an authentication request. For example, the systems and/or methods may retrieve a user name and/or password for a password authentication request, may retrieve a PIN string for a PIN authentication request, etc.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the terms "user" and/or "end user" may be used interchangeably. Also, the terms "user" and/or "end user" are intended to be broadly interpreted to include a user device or a user of a user device.

Figure 1:
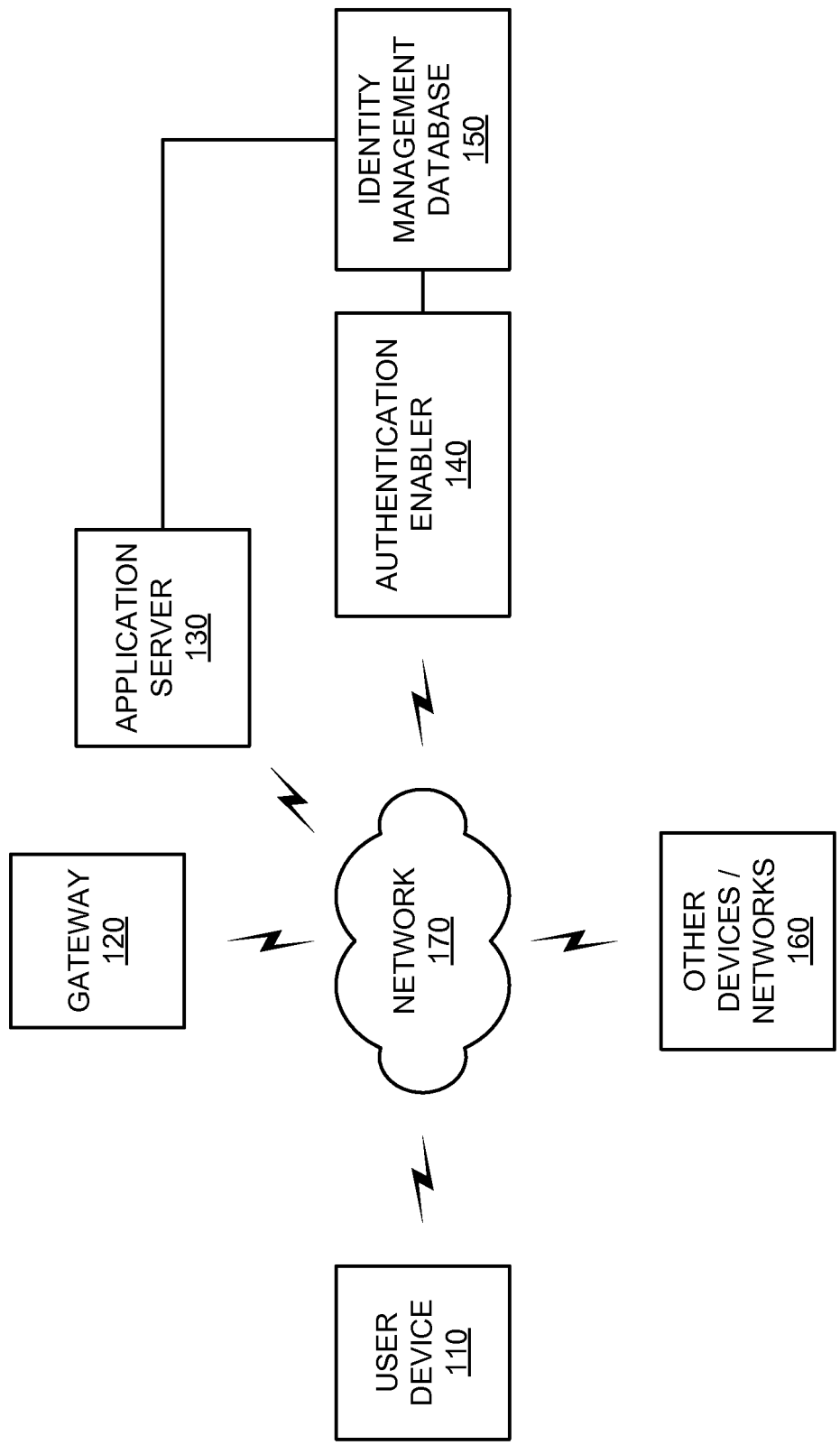
FIG. 1 is a diagram of an example network in which systems and/or methods described herein may be implemented.

FIG. 1 is a diagram of an example network 100 in which systems and/or methods described herein may be implemented. As illustrated, network 100 may include a user device 110, a gateway 120, an application server 130, an authentication enabler 140, an identity management database 150, and other devices and/or networks 160 interconnected by a network 170. Components of network 100 may interconnect via wired and/or wireless connections or links. A single user device 110, gateway 120, application server 130, authentication enabler 140, identity management database 150, other devices/networks 160, and network 170 have been illustrated in FIG. 1 for simplicity. In practice, there may be more user devices 110, gateways 120, application servers 130, authentication enablers 140, identity management databases 150, other devices/networks 160, and/or networks 170.

User device 110 may include any device that is capable of communicating with gateway 120, application server 130, authentication enabler 140, and/or other devices/networks 160 via network 170. For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smartphone, a laptop computer (e.g., with a wireless air card), a global positioning system (GPS) device, a content recording device (e.g., a camera, a video camera, etc.), a set-top box (STB), a voice over Internet protocol (VoIP) device, an analog terminal adaptor (ATA), etc. In another example, user device 110 may include a fixed (e.g., provided in a particular location, such as within a user's home) computation and/or communication device, such as a laptop computer, a personal computer, a tablet computer, a STB, a television, a gaming system, etc.

In one example implementation, user device 110 may include an authentication client that interfaces with an end user of user device 110, and communicates with gateway 120 and/or authentication enabler 140 to perform authentications of the end user. The authentication client may reside in a storage device provided in user device 110 or may reside in an external storage device, such as a Subscriber Identity Module (SIM) card, an external hard drive, a flash memory data storage device, etc. The authentication client, via user device 110, may enable the end user to access one or more third party applications provided in application server 130 and described below.

Gateway 120 may include one or more computation and/or communication devices that gather, process, search, and/or provide information in a manner described herein. For example, gateway 120 may include one or more server devices, network devices (e.g., routers, switches, firewalls, network interface cards (NICs), hubs, bridges, optical add-drop multiplexers (OADMs), etc.), etc. In an example implementation, gateway 120 may receive requests from third party applications provided by application server 130, and may perform policy actions on the requests. Gateway 120 may forward the requests for further processing (if necessary), and may route the requests to authentication enabler 140. The authentication enabler 140 may return responses (for the requests) to the gateway 120, and gateway 120 may provide the responses to the requesting third party applications. Gateway 120 may be a functional entity that may include one or more processing elements and may provide policy decisions and enforcement.

Policies, which may be invoked by gateway 120, may include authentication rules, business rules, authorization, etc. Authentication rules may include user names, passwords, personal identification numbers (PINs), etc. Business rules may include operations, definitions, and/or constraints that apply to an organization, and may apply to people, processes, corporate behavior and computing systems in an organization.

Application server 130 may include one or more server devices, or other types of computation or communication devices, that gather, process, search, and/or provide information in a manner described herein. In an example implementation, application server 130 may store one or more third party applications that use resources provided by a service provider network, which may include gateway 120, authentication enabler 140, identity management database 150, and other devices/networks 160. The third party applications may include applications that determine locations of mobile communication devices (e.g., user device 110), applications that connect calls between user device 110 and other user devices 110, voicemail applications, etc. The third party applications, via application server 130, may provide services to end users associated with user device 110, may make authentication requests to authentication enabler 140, and may make requests for other services to other enablers associated with the service provider network. The third party applications, via application server 130, may receive responses to such requests from gateway 120. Alternatively, or additionally, one or more of the third party applications may be permanently stored on user device 110 or may be retrieved from application server 130 and temporarily stored on user device 110.

Authentication enabler 140 may include one or more server devices, or other types of computation or communication devices, that gather, process, search, and/or provide information in a manner described herein. In an example implementation, authentication enabler 140 may receive a request for authenticating user device 110, an end user of user device 110, and/or a third party application being utilized by user device 110, and may perform the authentication requested by the request. Authentication enabler 140 may store session information associated with the authentication, and may generate a response indicating whether the authentication is successful (e.g., which may include the security, authentication, etc.) or is unsuccessful. In one example, authentication enabler 140 may utilize other devices/networks 160 for performing authentications, such as using an instant messaging system to authenticate the end user or using a voice communication system to authenticate a voice of the end user.

Identity management database 150 may include one or more storage devices that store information provided by and/or retrieved by gateway 120 and/or authentication enabler 140. In one example implementation, identity management database 150 may store identity management information, such as user identities, user credentials, tokens, user profiles, authentication policies, etc.

Other devices/networks 160 may include one or more computation or communication devices, or networks, that gather, process, search, and/or provide information in a manner described herein. In one example implementation, other devices/networks 160 may include other enabler devices (e.g., an instant messaging system, a voice processing system, a location enabler, etc.); a registration server; a network application function (NAF) device; a bootstrapping server function (BSF) device; a home subscriber server (HSS); etc.

Network 170 may include a local area network (LAN), a wide area network (WAN), a metropolitan area network (MAN), a telephone network, such as the Public Switched Telephone Network (PSTN), an intranet, the Internet, an optical fiber or fiber optic-based network, or a combination of networks. In one example implementation, network 170 may enable user device 110 to communicate with one or more of gateway 120, application server 130, authentication enabler 140, identity management database 150, and other devices/networks 160.

In one example implementation of network 100, authentication enabler 140 may provide third party applications, generated via application server 130 and used by user device 110, with the ability to request authentication of an identity, such as an end user of user device 110. Authentication enabler 140 may also enable the third party applications to request a type of authentication of the end user, such as via a user name and password. The third party applications, the end user, and the service provider network may implement policies that govern the authentication process performed by authentication enabler 140. For example, a third party application may require a two-factor authentication of the end user (e.g., something a user has and something a user knows), and may not explicitly request authentication when requesting other enablers, such as an instant messaging system, provided by other devices/networks 160. Such an authentication process may be referred to as a policy-based authentication and may involve gateway 120. Alternatively, or additionally, the authentication process may be a combination of requested behavior and policy evaluations.

The authentication client, associated with user device 110, may receive challenges and may process information, such as username and password, received from the end user, user device 110, gateway 120, application server 130, and/or other devices/networks 160. Authentication enabler 140 may receive requests to authenticate the end user, user device 110, and/or third party application utilized by user device 110. End user credentials, and information for authentication and identity management may be securely delivered to the authentication client, authentication enabler 140, and/or identity management database 150. Some end user credentials and/or identity information may be stored in other devices/networks 160, such as in a HSS.

Although FIG. 1 shows example components of network 100, in other implementations, network 100 may contain fewer components, different components, differently arranged components, or additional components than depicted in FIG. 1. Alternatively, or additionally, one or more of the components of network 100 may perform one or more functions described as being performed by another one or more of the components of network 100.

Figure 2:
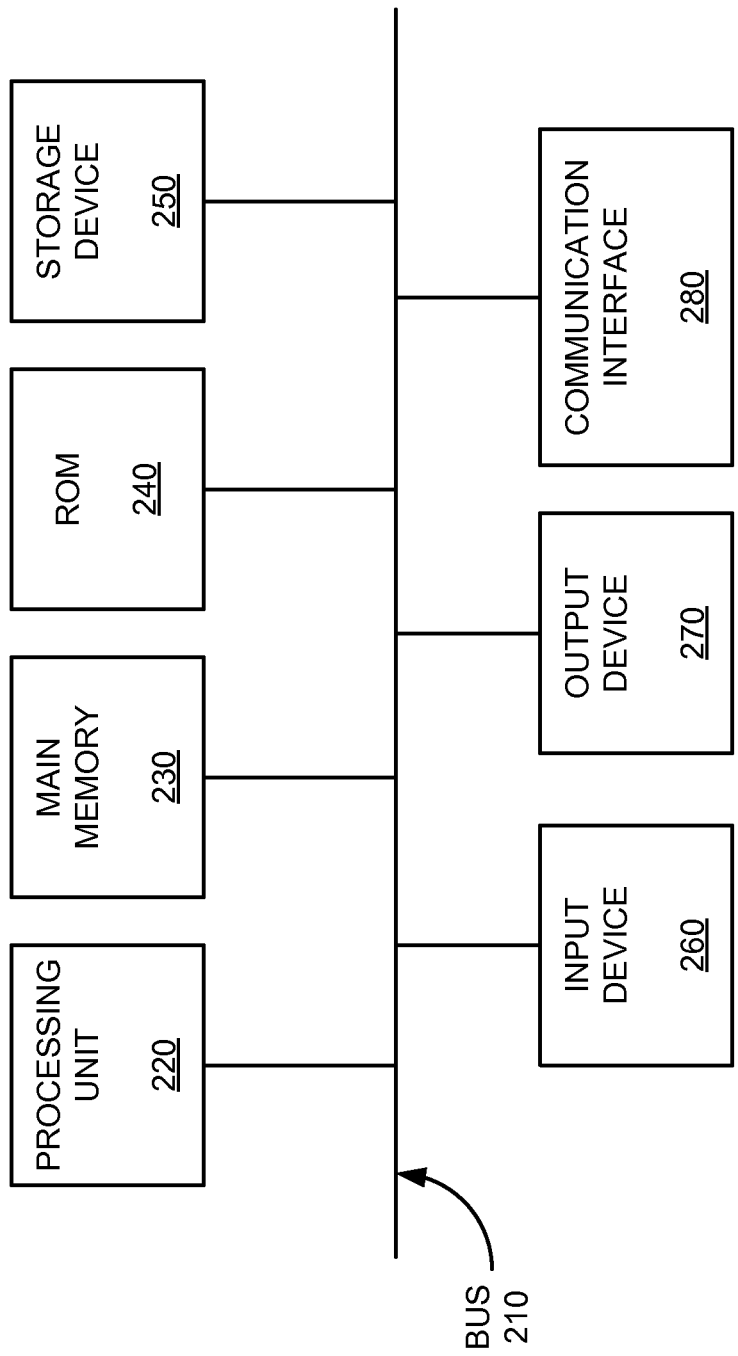
FIG. 2 is a diagram of example components of one or more devices of the network illustrated in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
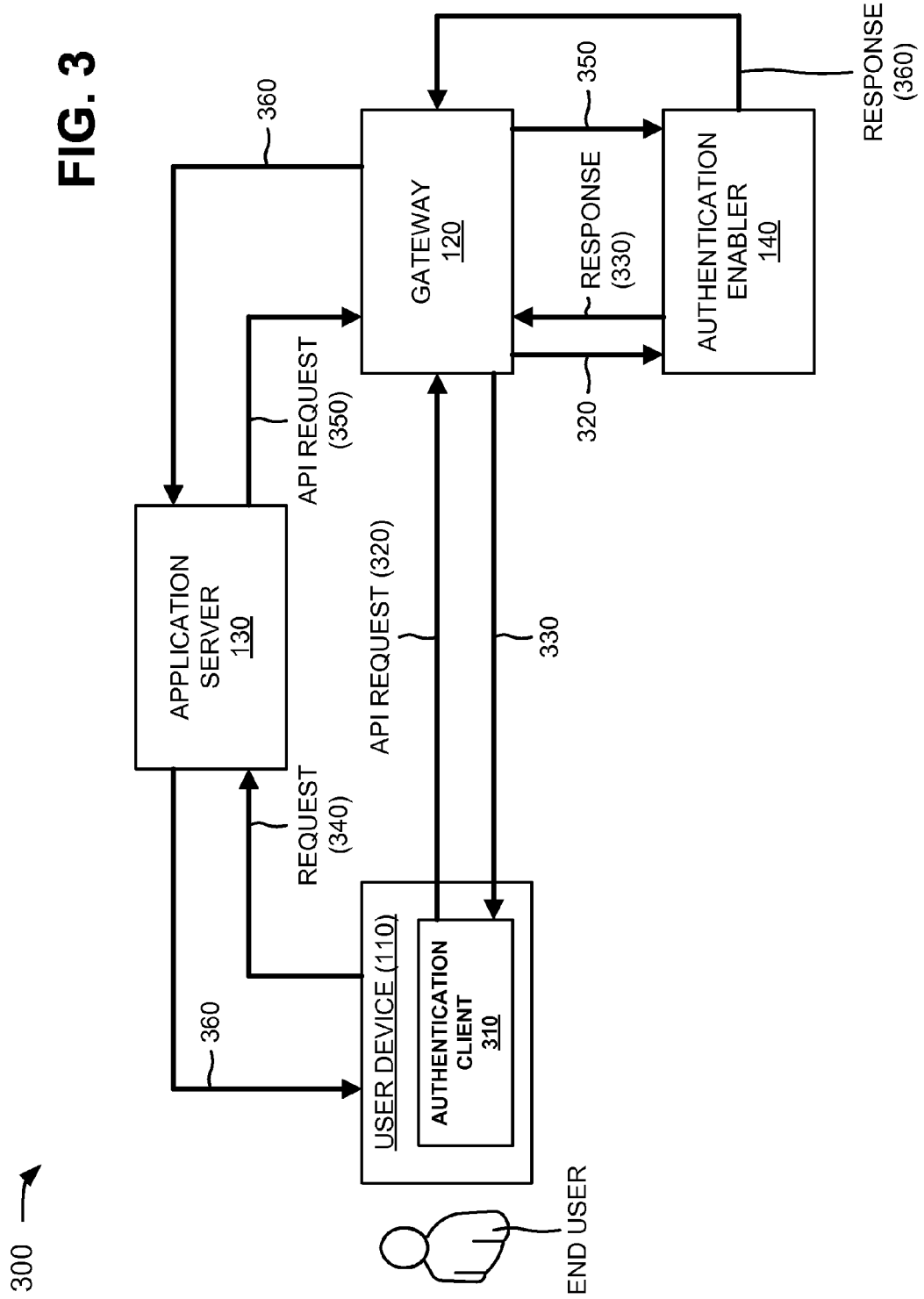
FIG. 3 is a diagram of example operations capable of being performed by an example portion of the network illustrated in FIG. 1.

FIG. 3 is a diagram of example operations capable of being performed by an example portion 300 of network 100. As shown in FIG. 3, network portion 300 may include user device 110, gateway 120, application server 130, and authentication enabler 140. User device 110, gateway 120, application server 130, and authentication enabler 140 may include the features described above in connection with one or more of, for example, FIGS. 1 and 2.

As further shown in FIG. 3, user device 110 may include an authentication client 310. Authentication client 310 may interface with an end user of user device 110, and may communicate with authentication enabler 140 to perform authentications of the end user. Authentication client 310 may reside in a storage device (e.g., storage device 250) provided in user device 110 or may reside in an external storage device, such as a SIM card, an external hard drive, a flash memory data storage device, etc. Authentication client 310, via user device 110, may enable the end user to access one or more third party applications provided in application server 130.

User device 110, via authentication client 310, may generate a request using an API provided by user device 110, as indicated by reference number 320. API request 320 may include a request for services provided by an enabler, such as a request to authenticate the end user and/or user device 110.

User device 110 may provide API request 320 to gateway 120, and gateway 120 may receive API request 320 and may evaluate API request 320 to determine what function is being requested by API request 320. For example, gateway 120 may determine that API request 320 is requesting authentication services provided by authentication enabler 140. Based on this determination, gateway 120 may forward API request 320 to authentication enabler 140. Authentication enabler 140 may receive API request 320, may perform the requested authentication, and may provide a response 330 to gateway 120. Response 330 may indicate that the end user and/or user device 110 are authenticated for services provided by application server 130 and/or the service provider network, which may include gateway 120, authentication enabler 140, identity management database 150, and other devices/networks 160. Gateway 120 may receive response 330, and may forward response 330 to authentication client 310 of user device 110. If response 330 indicates that the end user and/or user device 110 are authenticated, the end user and/or user device 110 may utilize services provided by application server 130 and/or the service provider network.

As further shown in FIG. 3, user device 110, via authentication client 310, may generate a request 340 for use of an application provided by application server 130. Application server 130 may receive request 340, and may generate, based on request 340, a request using an API provided by application server 130, as indicated by reference number 350. API request 350 may include a request for services provided by an enabler, such as a request to authenticate the end user, user device 110, and/or the application. Application server 130 may provide API request 350 to gateway 120, and gateway 120 may receive API request 350 and may evaluate API request 350 to determine what function is being requested by API request 350. For example, gateway 120 may determine that API request 350 is requesting authentication services provided by authentication enabler 140. Based on this determination, gateway 120 may forward API request 350 to authentication enabler 140. Authentication enabler 140 may receive API request 350, may perform the requested authentication, and may provide a response 360 to gateway 120. Response 360 may indicate that the end user, user device 110, and/or the application are authenticated for the application and/or for services provided by the service provider network. Gateway 120 may receive response 360, and may forward response 360 to application server 130. Application server 130 may forward response 360 to user device 110. If response 360 indicates that the end user, user device 110, and/or the application are authenticated, the end user and/or user device 110 may utilize the application and/or services provided by the service provider network.

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300.

Figure 4:
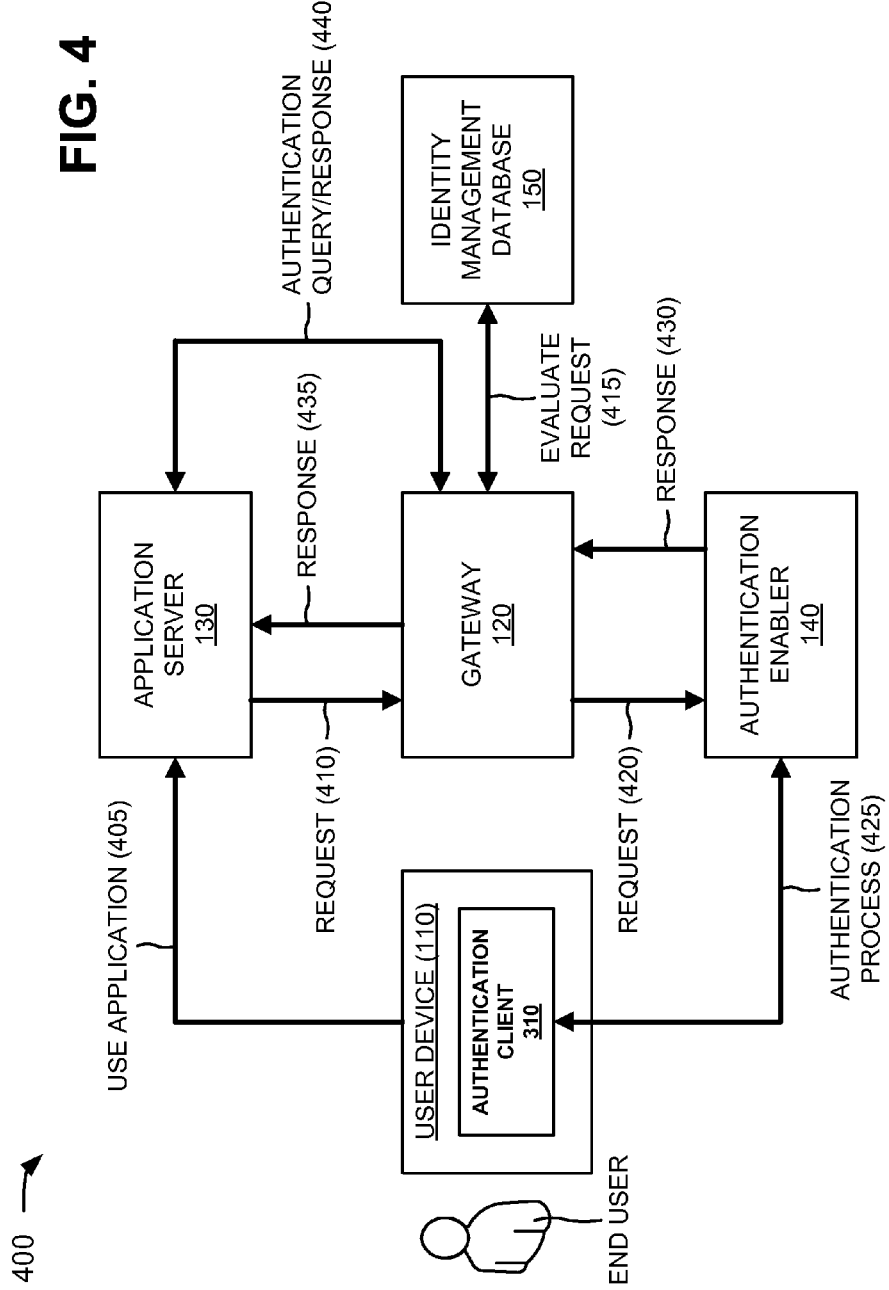
FIG. 4 is a diagram of example operations capable of being performed by another example portion of the network of FIG. 1.

FIG. 4 is a diagram of example operations capable of being performed by another example portion 400 of network 100. As shown in FIG. 4, network portion 400 may include user device 110, gateway 120, application server 130, authentication enabler 140, identity management database 150, and authentication client 310. User device 110, gateway 120, application server 130, authentication enabler 140, identity management database 150, and authentication client 310 may include the features described above in connection with one or more of, for example, FIGS. 1-3. In one example implementation, FIG. 4 may depict operations associated with an authentication process based on an authentication request received from an application provided in application server 130. The authentication process depicted in FIG. 4 may include a combination of requested behavior and policy evaluations.

As further shown in FIG. 4, an end user, via user device 110, may invoke the use of an application provided by application server 130, as indicated by reference number 405. Based on requested use 405 of the application, application server 130 may generate a request 410 to use authentication services provided by authentication enabler 140. Request 410 may include, for example, a request to authenticate the end user of user device 110 using a generic bootstrapping architecture (GBA), which is technology enabling authentication of a user of a mobile communication device. Alternatively, or additionally, request 410 may include a request to authenticate the end user with a user name and password that may not be known to the application but may be credentials in an account or identity profile associated with the end user. Alternatively, or additionally, request 410 may include a request to authenticate an end user via other authentication mechanisms, such as a PIN, a password, a one-time password, a public key cryptography (SSL), biometrics, etc. Request 410 may include an application identifier and an identifier for the end user, such as a mobile directory number (MDN) for user device 110 or other identifiers (e.g., an email address, a name of the end user, etc.). Request 410 may include other parameters, such as a type of authentication, a level of authentication assurance (e.g., based on National Institute of Standards and Technology (NIST) assurance levels), and optional parameters. An example request 410 may include the following parameters: application identifier (AppID=X); application password (AppPwd=Y); authentication method=password; identifier=MDN; and MDN=16175550101.

Application server 130 may provide request 410 to gateway 120, and gateway 120 may receive request 410. Gateway 120 may evaluate request 410 by retrieving information provided in identity management database 150, as indicated by reference number 415. For example, gateway 120 may evaluate 415 policies for the application, associated with request 410, to determine what and if authentication is required by request 410. Gateway 120 may also evaluate 415 policies for the end user identifier (e.g., the MDN), provided in request 410, to determine what and if authentication is required. Based on the evaluation of request 410, gateway 120 may provide a request 420 to authentication enabler 140. Request 420 may include the features of request 410, but may also include information obtained from the evaluation of request 410, such as an authentication required by request 410.

Authentication enabler 140 may receive request 420, and may communicate with authentication client 310, and possibly other devices/networks 160 (not shown), to perform the authentication process requested by request 420, as indicated by reference number 425. Based on performance of authentication process 425, authentication enabler 140 may generate a response 430. Response 430 may include an expiration value, and details of authentication process 425, such as whether or not the end user is authenticated. An example response 430 may include the following parameters: AppID=X; authentication=true; authentication method=password; identifier=MDN; MDN=16175550101; assurance=L1; and expiration 2011-11-16T23:59:58.75.

Authentication enabler 140 may provide response 430 to gateway 120, and gateway 120 may perform additional processing on response 430 (if necessary) to generate a response 435. Response 435 may include the features of response 430, but may also include information obtained from the additional processing of response 430. Gateway 120 may provide response 435 to application server 130, and application server 130 may determine whether the end user is authenticated for the application based on response 435. For example, if response 435 indicates that the end user is authenticated, application server 130 may permit the end user, via user device 110, to use the application. If response 435 indicates that the end user is not authenticated, application server 130 may not permit the end user to use the application.

As further shown in FIG. 4, application server 130 may provide an authentication query 440 to gateway 120. Authentication query 440 may request an authentication state associated with an application and/or an end user identity (e.g., the MDN). Gateway 120 may receive authentication query 440, and may evaluate authentication query 440 to ensure compliance with governing policies for the application and/or the end user identity. Gateway 120 may generate an authentication response 440 that may include a state of the authentication (e.g., true or false), an expiration time, and context information that comply with policies. For example, authentication response 440 may include the following parameters: AppID=X, authentication=true; authentication method=password; identifier=MDN; MDN=16175550101; assurance=L1; and expiration 2011-11-16T23:59:58.75. Gateway 120 may provide authentication response 440 to application server 130.

In one example implementation, requests 410/420 and responses 430/435 may include an authentication context, such as the authentication context used in the Security Assertion Markup Language (SAML). The authentication context may provide detailed information on a type and strength of authentication employed. In one example, the authentication context may request multifactor authentication, and may be included in requests 410/420. The authentication context may be based on a general Extensible Markup Language (XML) schema that defines mechanisms for creating authentication context declarations and a set of defined authentication context classes (e.g., each class with their own XML schema) that describe methods of authentication. The information provided in the authentication context may include initial user identification mechanisms (e.g., face-to-face, online, shared secret, etc.); mechanisms for minimizing compromise of credentials (e.g., credential renewal frequency, client-side key generation, etc.); mechanisms for storing and protecting credentials (e.g., smartcard, password rules, etc.); and authentication mechanisms or methods (e.g., password, certificate-based Secure Sockets Layer (SSL)).

Although FIG. 4 shows example components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5:
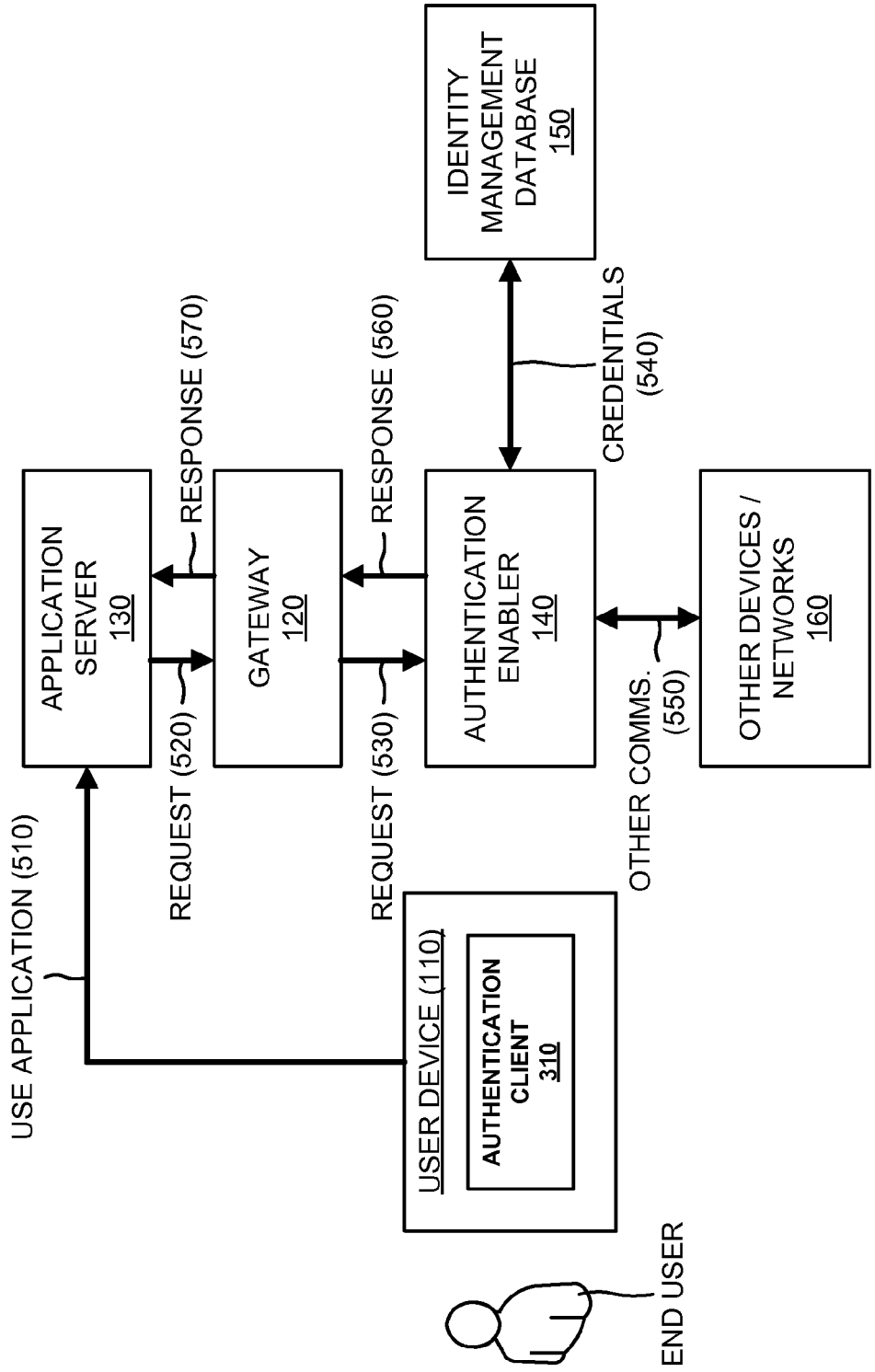
FIG. 5 is a diagram of example application authentication operations capable of being performed by an example portion of the network of FIG. 1.

FIG. 5 is a diagram of example application authentication operations capable of being performed by an example portion 500 of network 100 (FIG. 1). As shown in FIG. 5, network portion 500 may include user device 110, gateway 120, application server 130, authentication enabler 140, identity management database 150, other devices/networks 160, and authentication client 310. User device 110, gateway 120, application server 130, authentication enabler 140, identity management database 150, other devices/networks 160, and authentication client 310 may include the features described above in connection with one or more of, for example, FIGS. 1-4.

As further shown in FIG. 5, an end user, via user device 110, may invoke the use of an application provided by application server 130, as indicated by reference number 510. Based on requested use 510 of the application, application server 130 may generate a request 520 to use authentication services provided by authentication enabler 140. Request 520 may include a request for authentication of the end user of user device 110, and may specify a type of authentication requested, an application identifier, and an identifier for the end user (e.g., a user identifier).

Application server 130 may provide request 520 to gateway 120, and gateway 120 may receive request 520. Gateway 120 may evaluate request 520 by retrieving information provided in identity management database 150. For example, gateway 120 may evaluate policies for the application, associated with request 520, to determine what and if authentication is required. Gateway 120 may also evaluate policies for the user identifier, provided in request 520, to determine what and if authentication is required. Based on the evaluation of the information in request 520, gateway 120 may provide a request 530 to authentication enabler 140. Request 530 may include the features of request 520, but may also include information obtained from the evaluation of request 520, such as an authentication required by request 520.

Authentication enabler 140 may receive request 530, and may authenticate the application if the application is trusted. The application may include registered credentials for application authentication and/or other data for authentication. If the application is trusted, authentication enabler 140 may further process request 530. For example, authentication enabler 140 may map the user identifier, provided in request 530, to one or more different identifiers based on data provided by the application service provider or by another entity, carrier data required for GBA authentication, and/or other data used for authentication. For example, if request 530 includes a mobile phone number for the user identifier, authentication enabler 140 may map the mobile phone number to a unique identifier (e.g., "V098022") provided by the application service provider.

As further shown in FIG. 5, authentication enabler 140 may retrieve credentials 540 associated with the end user, and for the requested authentication, from identity management database 150, based on the application identifier and the user identifier. Authentication enabler 140 may communicate with other devices/networks 160 to obtain additional authentication information, as indicated by reference number 550. Based on credentials 540 and/or communications 550, authentication enabler 140 may authenticate the end user using the authentication method(s) specified in request 530. Based on the authentication of the end user, authentication enabler 140 may generate a response 560 that may include a success or a failure of the authentication and/or additional information related to the authentication.

Authentication enabler 140 may provide response 560 to gateway 120, and gateway 120 may log the information provided in response 560 and may generate a response 570. Response 570 may include the features of response 560. Gateway 120 may provide response 570 to application server 130, and application server 130 may determine whether the end user is authenticated for the application based on response 570. For example, if response 570 indicates that the end user is authenticated, application server 130 may permit the end user, via user device 110, to use the application. If response 570 indicates that the end user is not authenticated, application server 130 may not permit the end user to use the application.

Although FIG. 5 shows example components of network portion 500, in other implementations, network portion 500 may include fewer components, different components, differently arranged components, or additional components than depicted in FIG. 5. Alternatively, or additionally, one or more components of network portion 500 may perform one or more other tasks described as being performed by one or more other components of network portion 500.

Figure 6:
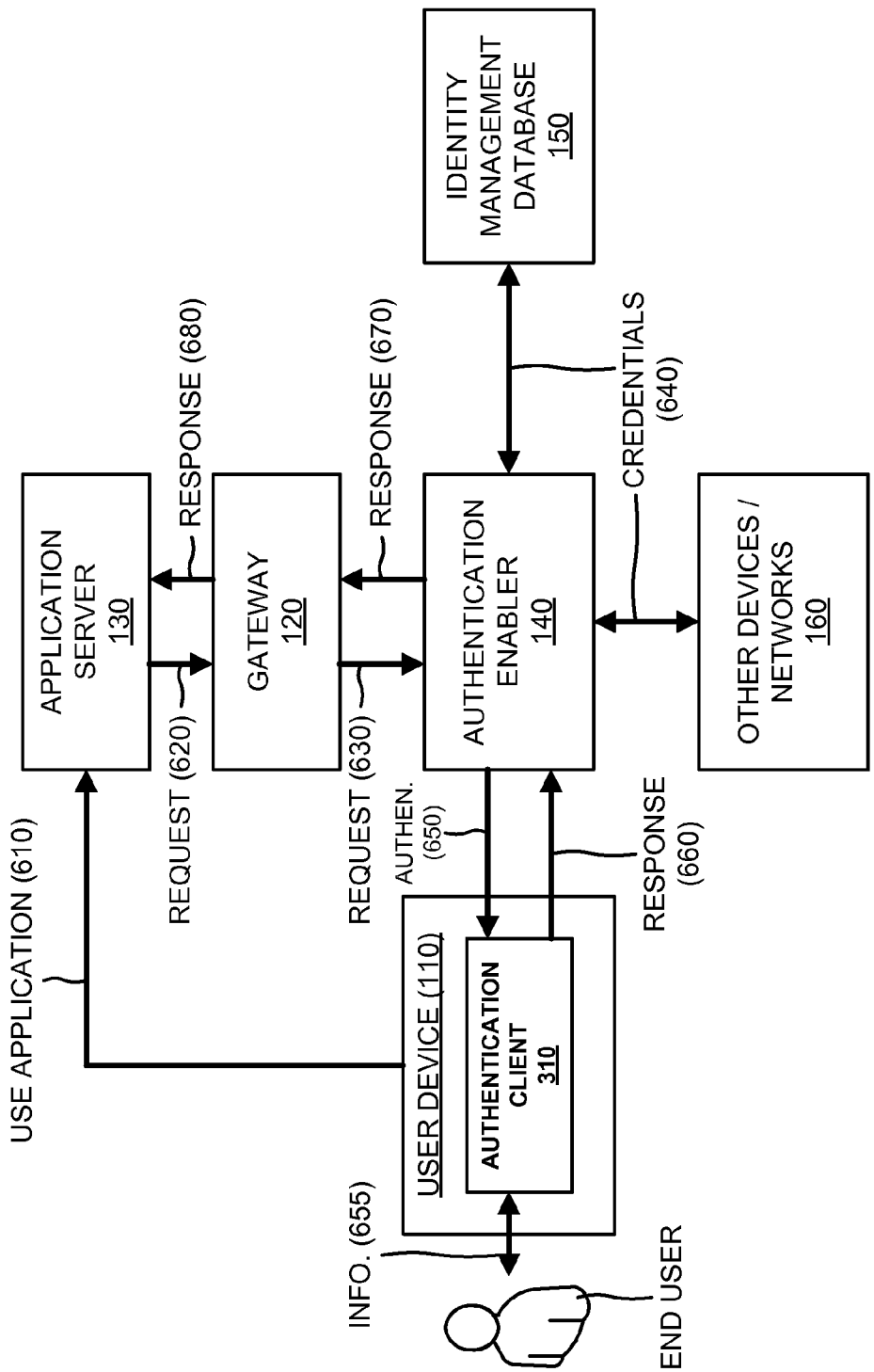
FIG. 6 is a diagram of example non-personal identification number (PIN) based authentication operations capable of being performed by an example portion of the network of FIG. 1.

FIG. 6 is a diagram of example non-personal identification number (PIN) based authentication operations capable of being performed by an example portion 600 of network 100 (FIG. 1). As shown in FIG. 6, network portion 600 may include user device 110, gateway 120, application server 130, authentication enabler 140, identity management database 150, other devices/networks 160, and authentication client 310. User device 110, gateway 120, application server 130, authentication enabler 140, identity management database 150, other devices/networks 160, and authentication client 310 may include the features described above in connection with one or more of, for example, FIGS. 1-5.

As further shown in FIG. 6, an end user, via user device 110, may invoke the use of an application provided by application server 130, as indicated by reference number 610. Based on requested use 610 of the application, application server 130 may generate a request 620 to use authentication services provided by authentication enabler 140. Request 620 may include a request for authentication of the end user of user device 110, and may specify a type of authentication requested, an application identifier, and an identifier for the end user (e.g., a user identifier). In one example, the application may not be registered by the application service provider for PIN authentication, and request 620 may indicate that the application is not registered for PIN authentication.

Application server 130 may provide request 620 to gateway 120, and gateway 120 may receive request 620. Gateway 120 may evaluate request 620 by retrieving information provided in identity management database 150. For example, gateway 120 may evaluate policies for the application, associated with request 620, to determine what and if authentication is required. Gateway 120 may also evaluate policies for the user identifier, provided in request 620, to determine what and if authentication is required. Based on the evaluation of request 620, gateway 120 may provide a request 630 to authentication enabler 140. Request 630 may include the features of request 620, but may also include information obtained from the evaluation of request 620, such as an authentication required by request 620.

Authentication enabler 140 may receive request 630, and may authenticate the application if the application is trusted. The application may include registered credentials for application authentication and/or other data for authentication. If the application is trusted, authentication enabler 140 may further process request 630. For example, authentication enabler 140 may map the user identifier, provided in request 630, to one or more different identifiers based on data provided by the application service provider or by another entity, carrier data required for GBA authentication, and/or other data used for authentication. Authentication enabler 140 may determine whether the application is registered for PIN authentication based on request 630.

As further shown in FIG. 6, authentication enabler 140 may retrieve credentials 640 associated with the end user, and for the requested authentication, from identity management database 150 and/or other devices/networks 160 based on the application identifier, the user identifier, and/or the mapped one or more different identifiers. Authentication enabler 140 may determine a type of authentication requested by request 630, and may perform the requested authentication. For example, if request 630 requests a GBA authentication, authentication enabler 140 may authenticate the end user and/or user device 110 using a GBA method that determines whether user device 110 is associated with the user identifier and that the association is valid and trusted.

If request 630 requests a PIN authentication, authentication enabler 140 may provide an authentication request 650, to authentication client 310, which instructs authentication client 310 to request the end user's PIN and provides information about the application. Based on authentication request 650, the end user may provide information 655 (e.g., the end user's PIN) to authentication client 310, and authentication client 310 may forward the PIN via a response 660 to authentication enabler 140. If request 630 requests other types of authentication methods, authentication enabler 140 may authenticate the end user and/or user device 110 using the other authentication methods provided by request 630.

Based on credentials 640, authentication enabler 140 may authenticate the end user and/or user device 110 using the authentication method(s) specified in request 630. Based on the authentication of the end user and/or user device 110, authentication enabler 140 may generate a response 670 that may include a success or a failure of the authentication and/or additional information related to the authentication.

Authentication enabler 140 may provide response 670 to gateway 120, and gateway 120 may log the information provided in response 670 and may generate a response 680. Response 680 may include the features of response 670. Gateway 120 may provide response 680 to application server 130, and application server 130 may determine whether the end user is authenticated for the application based on response 680. For example, if response 680 indicates that the end user is authenticated, application server 130 may permit the end user, via user device 110, to use the application. If response 680 indicates that the end user is not authenticated, application server 130 may not permit the end user to use the application.

Although FIG. 6 shows example components of network portion 600, in other implementations, network portion 600 may include fewer components, different components, differently arranged components, or additional components than depicted in FIG. 6. Alternatively, or additionally, one or more components of network portion 600 may perform one or more other tasks described as being performed by one or more other components of network portion 600.

Figure 7:
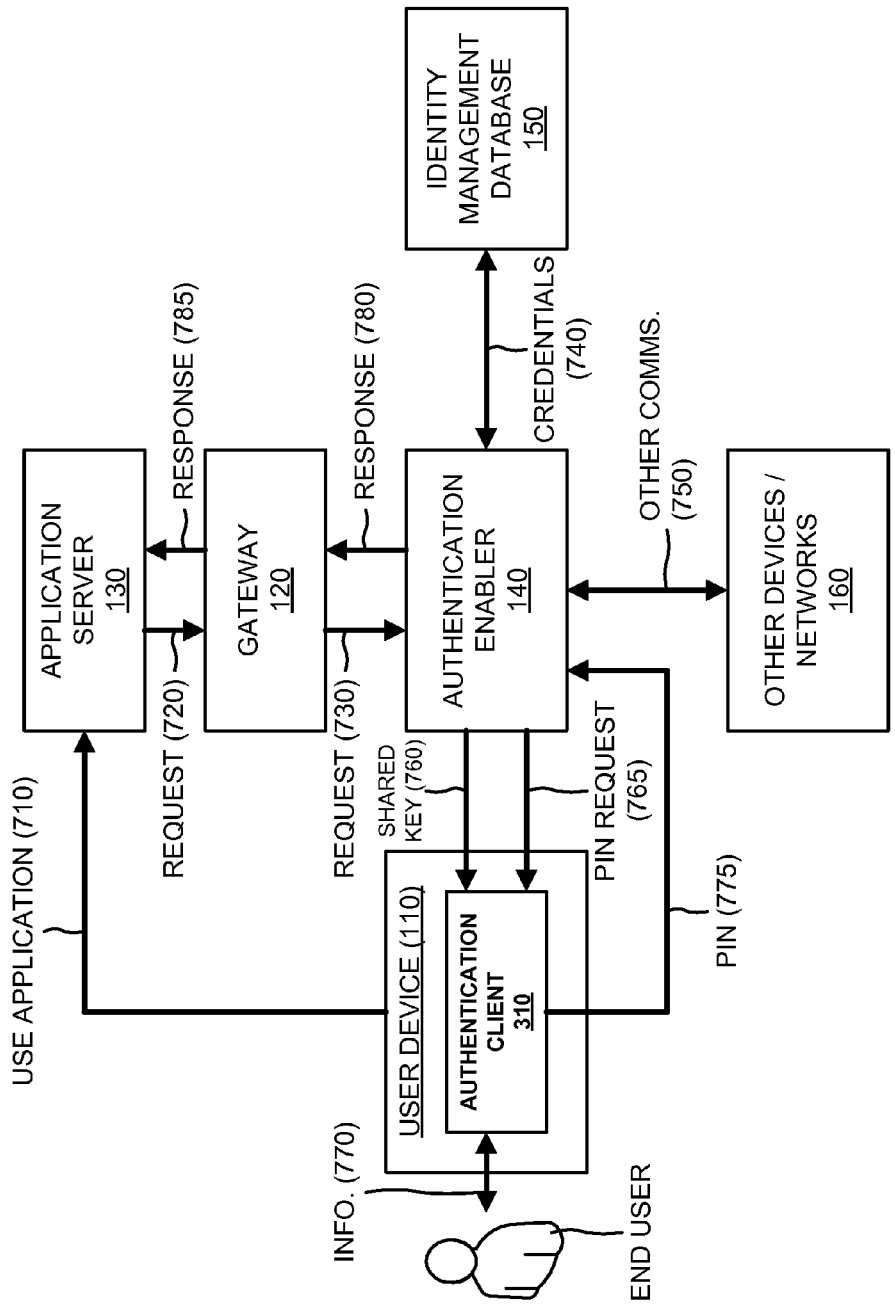
FIG. 7 is a diagram of example PIN based authentication operations capable of being performed by an example portion of the network of FIG. 1.

FIG. 7 is a diagram of example PIN based authentication operations capable of being performed by an example portion 700 of network 100 (FIG. 1). As shown in FIG. 7, network portion 700 may include user device 110, gateway 120, application server 130, authentication enabler 140, identity management database 150, other devices/networks 160, and authentication client 310. User device 110, gateway 120, application server 130, authentication enabler 140, identity management database 150, other devices/networks 160, and authentication client 310 may include the features described above in connection with one or more of, for example, FIGS. 1-6.

As further shown in FIG. 7, an end user, via user device 110, may invoke the use of an application provided by application server 130, as indicated by reference number 710. Based on requested use 710 of the application, application server 130 may generate a request 720 to use authentication services provided by authentication enabler 140. Request 720 may include a request for authentication of the end user of user device 110, and may specify a type of authentication requested, an application identifier, and an identifier for the end user (e.g., a user identifier). In one example, the application may be registered by the application service provider for PIN authentication, and request 720 may indicate that the application is registered for PIN authentication.

Application server 130 may provide request 720 to gateway 120, and gateway 120 may receive request 720. Gateway 120 may evaluate request 720 by retrieving information provided in identity management database 150. For example, gateway 120 may evaluate policies for the application, associated with request 720, to determine what and if authentication is required. Gateway 120 may also evaluate policies for the user identifier, provided in request 720, to determine what and if authentication is required. Based on the evaluation of request 720, gateway 120 may provide a request 730 to authentication enabler 140. Request 730 may include the features of request 720, but may also include information obtained from the evaluation of request 720, such as an authentication required by request 720.

Authentication enabler 140 may receive request 730, and may authenticate the application if the application is trusted. The application may include registered credentials for application authentication and/or other data for authentication. If the application is trusted, authentication enabler 140 may further process request 730. For example, authentication enabler 140 may map the user identifier, provided in request 730, to one or more different identifiers based on data provided by the application service provider or by another entity, carrier data required for GBA authentication, and/or other data used for authentication. Authentication enabler 140 may determine whether the application is registered for PIN authentication based on request 730.

As further shown in FIG. 7, authentication enabler 140 may retrieve credentials 740 associated with the end user, and for the requested authentication, from identity management database 150 based on the application identifier and the user identifier. Authentication enabler 140 may communicate with other devices/networks 160 to obtain additional authentication information, as indicated by reference number 750. Based on credentials 740 and/or other communications 750, authentication enabler 140 may authenticate user device 110 using the authentication method(s) specified in request 730. For example, authentication enabler 140 may authenticate user device 110 using a GBA method that determines whether user device 110 is associated with the user identifier and that the association is valid and trusted. The GBA method may result in a shared key 760 being generated by authentication enabler 140. Authentication enabler 140 may provide shared key 760 to authentication client 310, and authentication client 310 may store shared key 760. Shared key 760 may be used to protect (e.g., encrypt) information provided between user device 110 and authentication enabler 140.

Authentication enabler 140 may retrieve the end user's PIN from identity management database 150 (e.g., via credentials 740) based on the user identifier provided in request 730 and/or the mapped one or more different identifiers. Authentication enabler 140 may securely (e.g., via encryption with the shared key 760) provide a PIN request 765, to authentication client 310, which instructs authentication client 310 to request the end user's PIN and provides information about the application. Based on PIN request 765, the end user may provide information 770 (e.g., the end user's PIN 775) to authentication client 310, and authentication client 310 may securely (e.g., via encryption with the shared key 760) forward PIN 775 to authentication enabler 140.

Authentication enabler 140 may authenticate the end user based on credentials 740, other communications 750, and/or PIN 775. For example, authentication enabler 140 may compare PIN 775 with the PIN retrieved from identity management database 150 to determine whether the end user is authenticated. Based on the authentication of the end user and/or user device 110, authentication enabler 140 may generate a response 780 that may include a success or a failure of the authentication and/or additional information related to the authentication.

Authentication enabler 140 may provide response 780 to gateway 120, and gateway 120 may log the information provided in response 780 and may generate a response 785. Response 785 may include the features of response 780. Gateway 120 may provide response 785 to application server 130, and application server 130 may determine whether the end user is authenticated for the application based on response 785. For example, if response 785 indicates that the end user and user device 110 are authenticated, application server 130 may permit the end user, via user device 110, to use the application. If response 785 indicates that the end user or user device 110 is not authenticated, application server 130 may not permit the end user to use the application.

Although FIG. 7 shows example components of network portion 700, in other implementations, network portion 700 may include fewer components, different components, differently arranged components, or additional components than depicted in FIG. 7. Alternatively, or additionally, one or more components of network portion 700 may perform one or more other tasks described as being performed by one or more other components of network portion 700.

Figure 8:
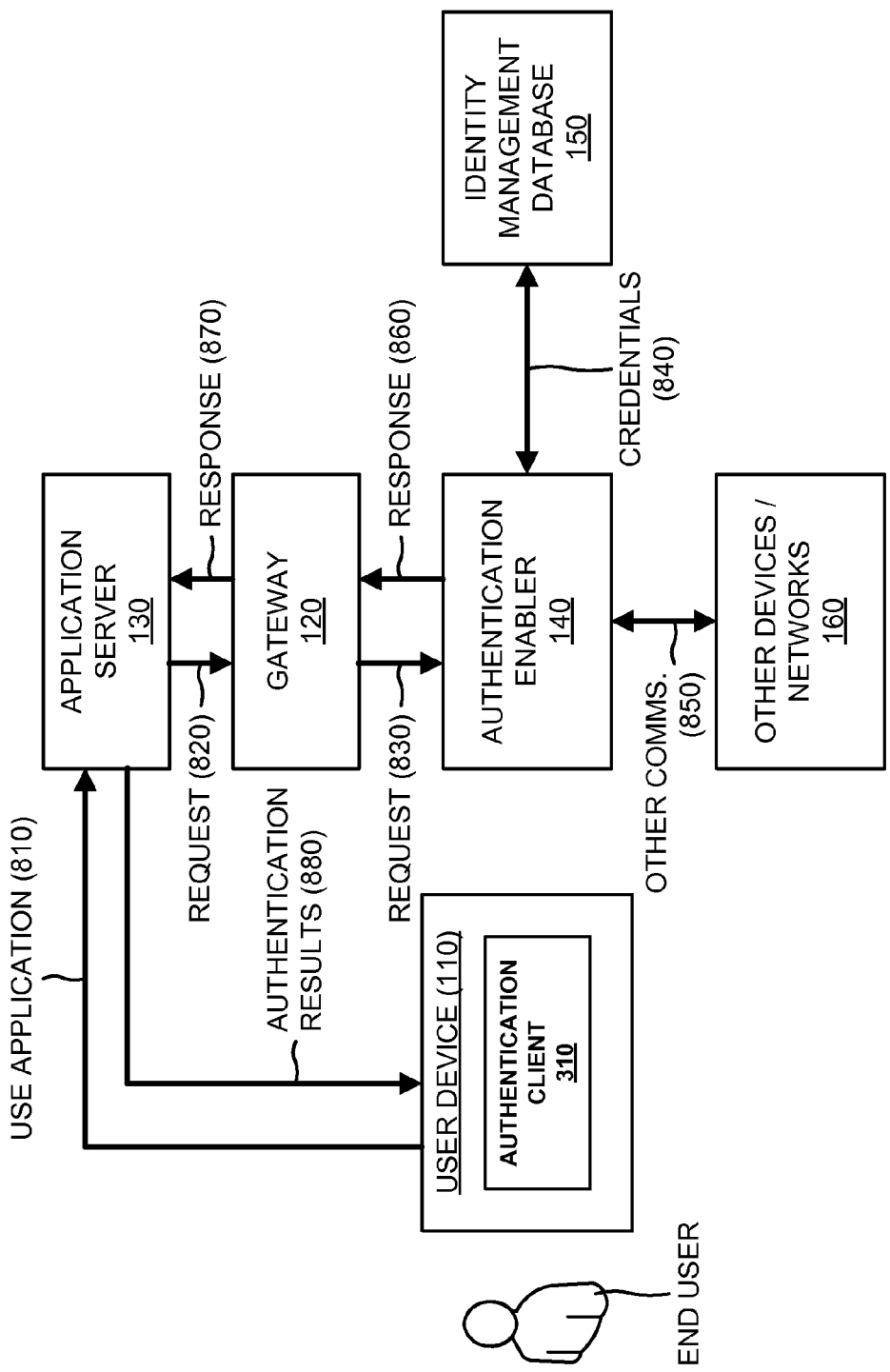
FIG. 8 is a diagram of example messaging operations capable of being performed by an example portion of the network of FIG. 1.

FIG. 8 is a diagram of example messaging operations capable of being performed by an example portion 800 of network (FIG. 1). As shown in FIG. 8, network portion 800 may include user device 110, gateway 120, application server 130, authentication enabler 140, identity management database 150, other devices/networks 160, and authentication client 310. User device 110, gateway 120, application server 130, authentication enabler 140, identity management database 150, other devices/networks 160, and authentication client 310 may include the features described above in connection with one or more of, for example, FIGS. 1-7.

As further shown in FIG. 8, an end user, via user device 110, may invoke the use of an application provided by application server 130, as indicated by reference number 810. Based on requested use 810 of the application, application server 130 may generate a request 820 to use authentication services provided by authentication enabler 140. Request 820 may include a request for authentication of the end user of user device 110 via an API, and may specify a type of authentication requested, an application identifier, and an identifier for the end user (e.g., a user identifier).

Application server 130 may provide request 820 to gateway 120, and gateway 120 may receive request 820. Gateway 120 may evaluate request 820 by retrieving information provided in identity management database 150. For example, gateway 120 may evaluate policies for the application, associated with request 820, to determine what and if authentication is required. Gateway 120 may also evaluate policies for the user identifier, provided in request 820, to determine what and if authentication is required. Based on the evaluation of request 820, gateway 120 may authenticate the application if the application is trusted. The application may include registered credentials for application authentication and/or other data for authentication. If the application is trusted, gateway 120 may provide a request 830 to authentication enabler 140. Request 830 may include the features of request 820, but may also include information obtained from the evaluation of request 820, such as an authentication required by request 820.

Authentication enabler 140 may receive request 830, and may retrieve credentials 840 associated with the end user, and for the requested authentication, from identity management database 150 based on the application identifier and the user identifier. Authentication enabler 140 may communicate with other devices/networks 160 to obtain other authentication information, as indicated by reference number 850. Based on credentials 840 and/or communications 850, authentication enabler 140 may authenticate the end user and/or user device 110 using the authentication method(s) specified in request 830. Based on the authentication of the end user and/or user device 110, authentication enabler 140 may generate an API response 860 that may include a success or a failure of the authentication and/or additional information related to the authentication.

Authentication enabler 140 may provide response 860 to gateway 120, and gateway 120 may log the information provided in response 860 and may generate a response 870. Response 870 may include the features of response 860. Gateway 120 may provide response 870 to application server 130, and application server 130 may determine whether the end user is authenticated for the application based on response 870. For example, if response 870 indicates that the end user is authenticated, application server 130 may permit the end user, via user device 110, to use the application. If response 870 indicates that the end user is not authenticated, application server 130 may not permit the end user to use the application. As further shown in FIG. 8, application server 130 may provide such authentication results 880 to user device 110.

Although FIG. 8 shows example components of network portion 800, in other implementations, network portion 800 may include fewer components, different components, differently arranged components, or additional components than depicted in FIG. 8. Alternatively, or additionally, one or more components of network portion 800 may perform one or more other tasks described as being performed by one or more other components of network portion 800.

Figure 9:
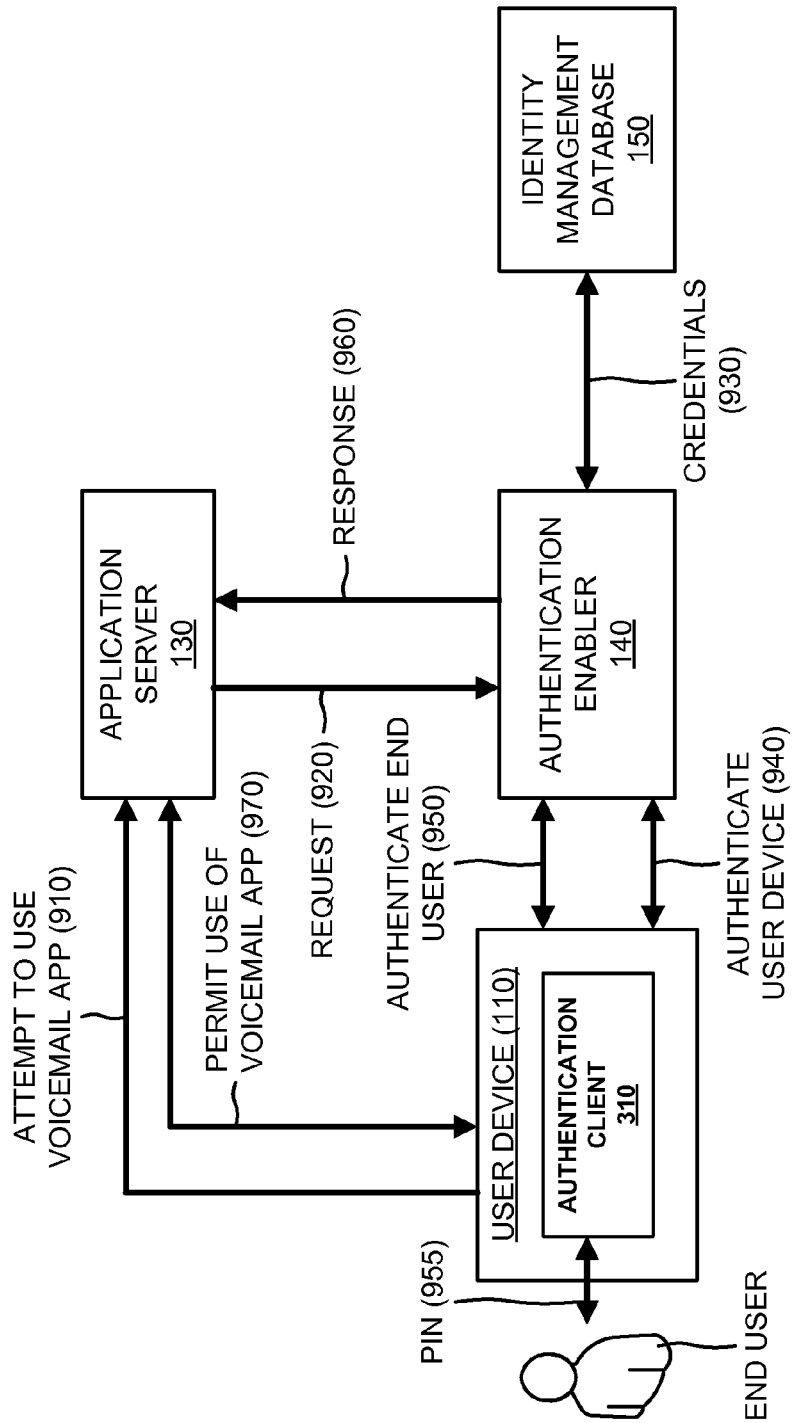
FIG. 9 is a diagram of an example PIN based authentication use case capable of being performed by an example portion of the network of FIG. 1.

FIG. 9 is a diagram of an example PIN based authentication use case capable of being performed by an example portion 900 of network 100 (FIG. 1). As shown in FIG. 9, network portion 900 may include user device 110, application server 130, authentication enabler 140, identity management database 150, and authentication client 310. User device 110, application server 130, authentication enabler 140, identity management database 150, and authentication client 310 may include the features described above in connection with one or more of, for example, FIGS. 1-8.

As further shown in FIG. 9, an end user, via user device 110, may attempt to use a voicemail application provided by application server 130, as indicated by reference number 910. Based on the attempted use 910 of the voicemail application, application server 130 may generate a request 920 to use authentication services provided by authentication enabler 140. Request 920 may include a request for authentication of the end user and/or user device 110, and may specify a type of authentication requested, an application identifier, an identifier for the end user (e.g., a user identifier), a MDN of user device 110, etc.

Application server 130 may provide request 920 to authentication enabler 140, and authentication enabler 140 may receive request 920. Authentication enabler 140 may authenticate the voicemail application if the application is trusted. The voicemail application may include registered credentials for application authentication and/or other data for authentication. If the voicemail application is trusted, authentication enabler 140 may retrieve credentials 930 associated with the end user, and for the requested authentication, from identity management database 150 based on the application identifier and the user identifier. Based on credentials 930, authentication enabler 140 may authenticate user device 110 using a GBA method, as indicated by reference number 940.

If user device 110 is authenticated via the GBA method, authentication enabler 140 may authenticate the end user, as indicated by reference number 950. For example, authentication enabler 140 may request a PIN 955 associated with the end user via authentication client 310. PIN 955 may be managed and owned by the end user rather than the application service provider. Authentication enabler 140 may compare PIN 955 with a PIN retrieved from identity management database 150 (e.g., via credentials 930) to determine whether the end user is authenticated. Based on the authentication of the end user and/or user device 110, authentication enabler 140 may generate a response 960 that may include a success or a failure of the authentication and/or additional information related to the authentication.

Authentication enabler 140 may provide response 960 to application server 130, and application server 130 may determine whether the end user is authenticated for the voicemail application based on response 960. For example, if response 960 indicates that the end user and user device 110 are authenticated, application server 130 may permit the end user, via user device 110, to use the voicemail application, as indicated by reference number 970. In one example, the end user may be authenticated for the voicemail application if the end user is using his/her user device 110 and inputs a correct PIN 955 associated with the end user. If response 960 indicates that the end user or user device 110 is not authenticated, application server 130 may not permit the end user to use the voicemail application.

Although FIG. 9 shows example components of network portion 900, in other implementations, network portion 900 may include fewer components, different components, differently arranged components, or additional components than depicted in FIG. 9. Alternatively, or additionally, one or more components of network portion 900 may perform one or more other tasks described as being performed by one or more other components of network portion 900.

Figure 10:
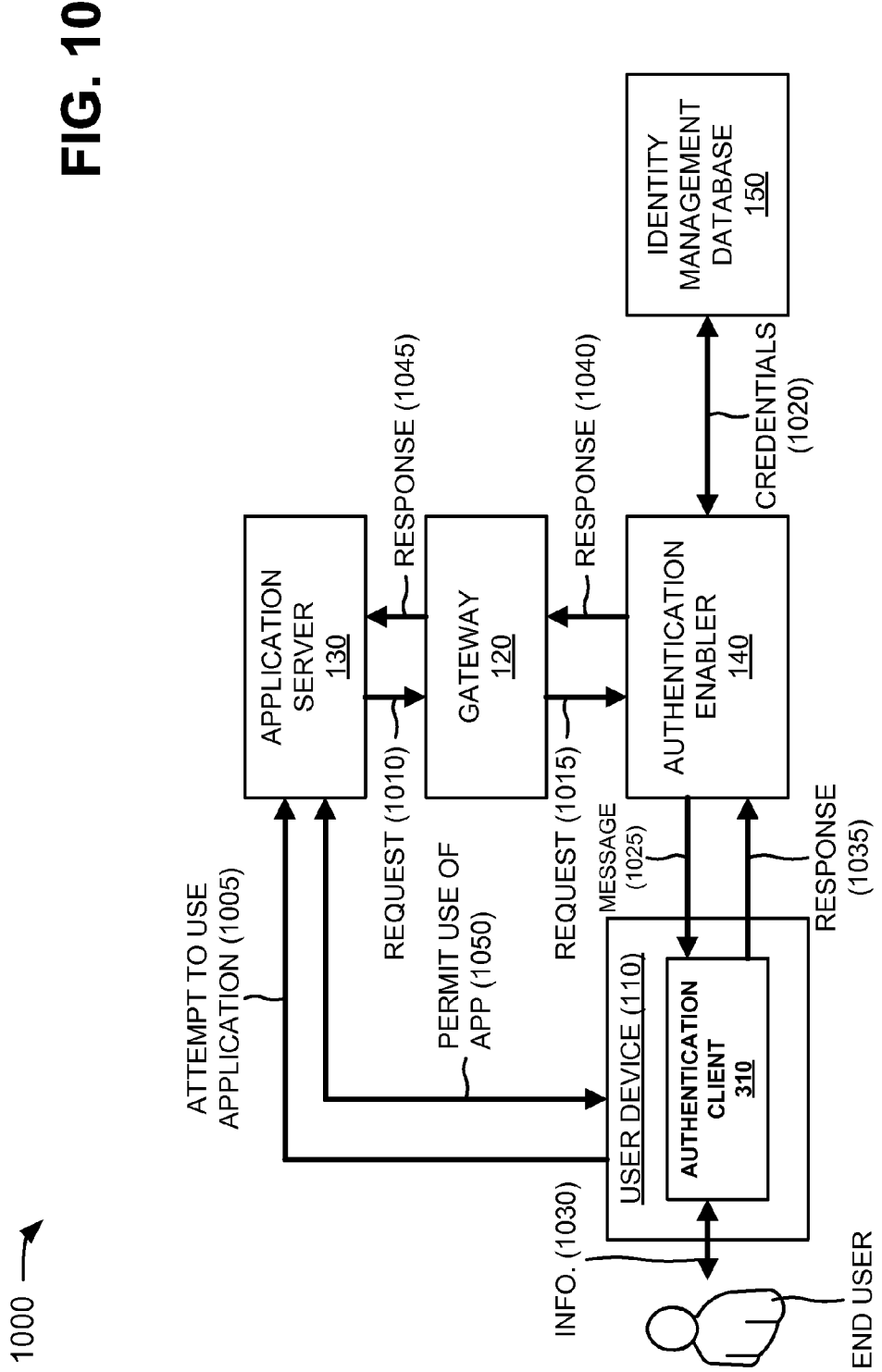
FIG. 10 is a diagram of another example PIN based authentication use case capable of being performed by an example portion of the network of FIG. 1.

FIG. 10 is a diagram of another example PIN based authentication use case capable of being performed by an example portion 1000 of network 100 (FIG. 1). As shown in FIG. 10, network portion 1000 may include user device 110, gateway 120, application server 130, authentication enabler 140, identity management database 150, and authentication client 310. User device 110, gateway 120, application server 130, authentication enabler 140, identity management database 150, and authentication client 310 may include the features described above in connection with one or more of, for example, FIGS. 1-9.

As further shown in FIG. 10, an end user, via user device 110, may attempt to use an application provided by application server 130, as indicated by reference number 1005. Based on attempted use 1005 of the application, application server 130 may generate a request 1010 to use authentication services provided by authentication enabler 140. Request 1010 may include a request for authentication of the end user of user device 110, and may specify a type of authentication requested (e.g., a PIN authentication), an application identifier, and an identifier for the end user (e.g., a user identifier).

Application server 130 may provide request 1010 to gateway 120, and gateway 120 may receive request 720. Gateway

120 may evaluate request 1010 by retrieving information provided in identity management database 150. For example, gateway 120 may evaluate policies for the application, associated with request 1010, to determine whether the application is authenticated. Gateway 120 may also evaluate policies for the user identifier, provided in request 1010, to determine what and if authentication is required. Based on the evaluation of request 1010, gateway 120 may authenticate the application, and may provide a request 1015 to authentication enabler 140. Request 1015 may include the features of request 1010, but may also include information obtained from the evaluation of request 1010, such as an authentication required by request 1010.

Authentication enabler 140 may receive request 1015, and may determine that the authentication requested by request 1015 requires both GBA authentication and PIN authentication. Authentication enabler 140 may retrieve credentials 1020 associated with the end user, and for the requested authentication, from identity management database 150 based on the application identifier and the user identifier. Based on credentials 1020, authentication enabler 140 may provide a message (e.g., a session initiation protocol (SIP) message) 1025 to authentication client 310. Message 1025 may request authentication client 310 to authenticate the end user and/or user device 110 using GBA authentication and PIN authentication.

Authentication client 310 may receive message 1025, and may communicate with a GBA authentication system (not shown) to authenticate user device 110 using a GBA method. The GBA method may determine whether user device 110 is associated with the user identifier and that the association is valid and trusted. The GBA method may result in a shared key being generated. The shared key may be used to protect (e.g., encrypt) information provided between user device 110 and authentication enabler 140.

If user device 110 is authenticated, authentication client 310 may request the end user's PIN and may provide information about the application. Based on the PIN request, the end user may provide information 1030 (e.g., the end user's PIN) to authentication client 310, and authentication client 310 may securely (e.g., via encryption with the shared key) forward the PIN to authentication enabler 140, via a response 1035 (e.g., another SIP message).

Authentication enabler 140 may retrieve the end user's PIN from identity management database 150 (e.g., via credentials 1020) based on the user identifier provided in request 1015. Authentication enabler 140 may authenticate the end user based on credentials 1020 and/or based on the end user's PIN. For example, authentication enabler 140 may compare the end user's PIN with the PIN retrieved from identity management database 150 to determine whether the end user is authenticated. Based on the authentication of the end user and/or user device 110, authentication enabler 140 may generate a response 1040 that may include a success or a failure of the authentication and/or additional information related to the authentication.

Authentication enabler 140 may provide response 1040 to gateway 120, and gateway 120 may log the information provided in response 1040 and may generate a response 1045. Response 1045 may include the features of response 1040. Gateway 120 may provide response 1045 to application server 130, and application server 130 may determine whether the end user is authenticated for the application based on response 1045. For example, if response 1045 indicates that the end user and user device 110 are authenticated, application server 130 may permit the end user, via user device 110, to use the application, as indicated by reference number 1050. If response 1045 indicates that the end user or user device 110 is not authenticated, application server 130 may not permit the end user to use the application.

Although FIG. 10 shows example components of network portion 1000, in other implementations, network portion 1000 may include fewer components, different components, differently arranged components, or additional components than depicted in FIG. 10. Alternatively, or additionally, one or more components of network portion 1000 may perform one or more other tasks described as being performed by one or more other components of network portion 1000.

FIG. 11 is a diagram of example voicemail authentication operations capable of being performed by an example portion 1100 of network 100 (FIG. 1). As shown in FIG. 11, network portion 1100 may include user device 110, application server 130, authentication enabler 140, authentication client 310, and a GBA system 1105. User device 110, application server 130, authentication enabler and authentication client 310 may include the features described above in connection with one or more of, for example, FIGS. 1-10. GBA system 1105 may include one or more computation and/or communication devices that provide GBA authentication.

As further shown in FIG. 11, an end user, via user device 110, may attempt to use a voicemail application (e.g., check voicemails) provided by application server 130, as indicated by reference number 1110. Based on the attempted use 1110 of the voicemail application, application server 130 may generate a request 1115 to use authentication services provided by authentication enabler 140. Request 1115 may include a request for authentication of the end user and/or user device 110, and may specify a type of authentication requested, an application identifier, an identifier for the end user (e.g., a user identifier), a MDN of user device 110, etc. For example, request 1115 may include a request for a GBA authentication of user device 110 and a PIN authentication of the end user.

Application server 130 may provide request 1115 to authentication enabler 140, and authentication enabler 140 may receive request 1115. Authentication enabler 140 may authenticate the voicemail application if the application is trusted. The voicemail application may include registered credentials for application authentication and/or other data for authentication. If the voicemail application is trusted, authentication enabler 140 may provide a GBA/PIN authentication request 1120 (e.g., a SIP message) to application client 310. GBA/PIN authentication request 1120 may request authentication client 310 to authenticate the end user and/or user device 110 using GBA authentication and PIN authentication.

Authentication client 310 may receive GBA/PIN authentication request 1120, and may communicate with GBA system 1105 to authenticate user device 110 using a GBA authentication method 1125. GBA system 1105 may determine whether user device 110 is associated with the user identifier and that the association is valid and trusted. GBA system 1105 may generate a shared key that may be used to protect (e.g., encrypt) information provided between authentication client 310 and authentication enabler 140. If user device 110 is authenticated, authentication client 310 may request the end user's PIN 1130 and may provide information about the application. Based on the PIN request, the end user may provide PIN 1130 to authentication client 310, and authentication client 310 may securely (e.g., via encryption with the shared key) forward PIN 1130 to authentication enabler 140, via a response 1135 (e.g., another SIP message).

Authentication enabler 140 may retrieve the end user's PIN from identity management database 150 (not shown) based on the user identifier provided in request 1115. Authentication enabler 140 may authenticate the end user based on PIN 1130 and/or based on the retrieved end user's PIN. For example, authentication enabler 140 may compare PIN 1130 with the PIN retrieved from identity management database 150 to determine whether the end user is authenticated. Based on the authentication of the end user and/or user device 110, authentication enabler 140 may generate a response 1140 that may include a success or a failure of the authentication and/or additional information related to the authentication.

Authentication enabler 140 may provide response 1140 to application server 130, and application server 130 may determine whether the end user is authenticated for the voicemail application based on response 1140. For example, if response 1140 indicates that the end user and user device 110 are authenticated, application server 130 may permit the end user, via user device 110, to retrieve voicemails from the voicemail application, as indicated by reference number 1145. If response 1140 indicates that the end user or user device 110 is not authenticated, application server 130 may not permit the end user to use the voicemail application.

Although FIG. 11 shows example components of network portion 1100, in other implementations, network portion 1100 may include fewer components, different components, differently arranged components, or additional components than depicted in FIG. 11. Alternatively, or additionally, one or more components of network portion 1100 may perform one or more other tasks described as being performed by one or more other components of network portion 1100.

Figure 12A:
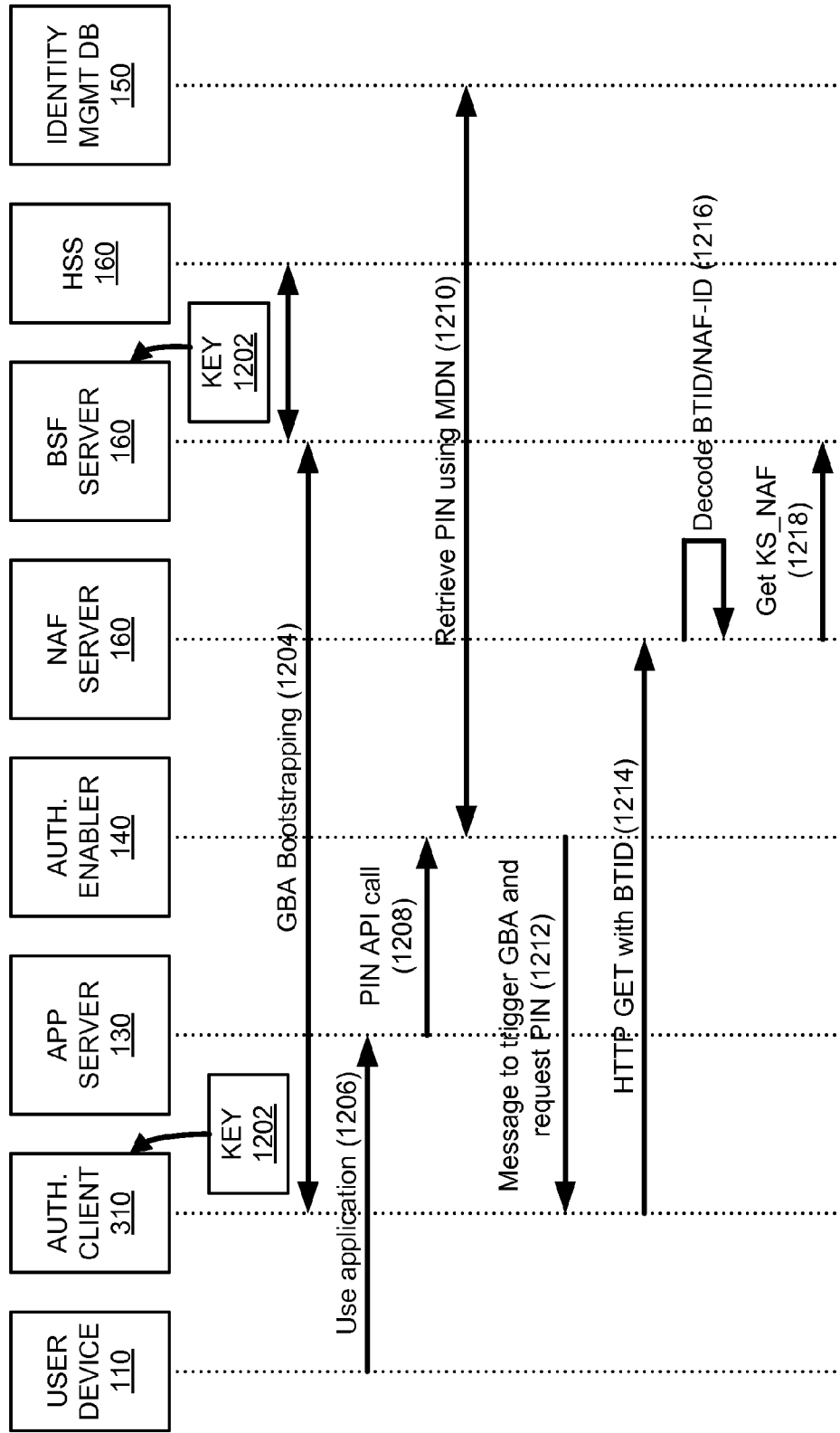

FIGS. 12A-12C are flow diagrams of example PIN and GBA based authentication operations capable of being performed by an example portion 1200 of network 100 (FIG. 1). As shown in FIGS. 12A-12C, network portion 1200 may include user device 110, application server 130, authentication enabler 140, a NAF server 160, a BSF server 160, a HSS 160, identity management database 150, and authentication client 310. User device 110, application server 130, authentication enabler 140, identity management database 150, and authentication client 310 may include the features described above in connection with one or more of, for example, FIGS. 1-11.

BSF server 160 may perform GBA bootstrapping for an unknown user device 110, as indicated by reference number 1204. When authentication client 310 re-connects to BSF server 160, BSF server 160 may obtain the session key material, as well as user specific data, from HSS 160. Authentication client 310 may communicate with BSF server 160 to derive a shared session key 1202. BSF server 160 may include one or more server devices, or other types of computation and/or communication devices, that gather, process, search, and/or provide information in a manner described herein. In an example implementation, BSF server 160 may provide application independent functions for mutual authentication of authentication client 310 and other devices unknown to each other and for bootstrapping an exchange of secret session keys.

HSS 160 may include one or more server devices, or other types of computation and/or communication devices, that gather, process, search, and/or provide information in a manner described herein. In an example implementation, HSS 160 may include one or more user databases that support network entities that handle calls. The one or more databases of HSS 160 may include subscription-related information (e.g., user profiles). HSS 160 may perform authentication and authorization of a user, and may provide information about the user's (e.g., user device's 110) profile and subscriptions.

As further shown in FIG. 12A, a shared key 1202 may be provided to and stored in authentication client 310 and BSF server 160. A GBA bootstrapping method 1204 may be provided between authentication client 310 and BSF server 160. A user of user device 110 may attempt to use an application (e.g., a voicemail application) provided by application server 130, as indicated by reference number 1206. Based on attempted use of the application, application server 130 may provide a PIN API call 1208 to authentication enabler 140. PIN API call 1208 may request that authentication enabler 140 authenticate a MDN of user device 110. Based on PIN API call 1208, authentication enabler 140 may retrieve the user's PIN from identity management database 150, as indicated by reference number 1210.

Authentication enabler 140 may, based on PIN API call 1208, provide a message 1212 to authentication client 310. Message 1212 may request that authentication client 310 perform a GBA authentication and request a PIN from the user. Based on message 1212, authentication client 310 may provide a hypertext transfer protocol (HTTP) GET request 1214 to NAF server 160. HTTP GET request 1214 may include a Bootstrapping Transaction Identifier (BTID), a digest calculated from a GBA key (KS_NAF), and other parameters. Based on HTTP GET request 1214, NAF server 160 may decode the BTID and a NAF-ID, as indicated by reference number 1216. NAF server 160 may request, from BSF server 160, the KS_NAF for the decoded BTID and NAF-ID, as indicated by reference number 1218.

As shown in FIG. 12B, BSF server 160 may generate a KS_NAF 1222 based on the decoded BTID and NAF-ID, as indicated by reference number 1220, and may provide KS_NAF 1222 to NAF server 160. BSF server 160 may provide, to NAF server 160, a HTTP 200 OK message 1224 that includes KS_NAF 1222. Based on KS_NAF 1222 and HTTP 200 OK message 1224, NAF server 160 may calculate a digest from KS_NAF 1222 and other parameters, and may compare the digest with a received digest to determine whether the digests match, as indicated by reference number 1226. If the digests match, NAF server 160 may provide a HTTP 200 OK message 1228, indicating that the authentication is successful, to authentication client 310.

As shown in FIG. 12C, based on HTTP 200 OK message 1228, authentication client 310 may request a PIN from the user of user device 110, as indicated by reference number 1230. The user may provide a PIN 1232 to user device 110 in response to the PIN request, and user device 110 may provide PIN 1232 to authentication client 310. Authentication client 310 may encrypt and send PIN 1232 and a GBA success response 1234 to authentication enabler 140. If the GBA authentication is successful (e.g., as indicated by response 1234), authentication enabler 140 may retrieve KS_NAF 1222 from NAF server 160, as indicated by reference number 1236. Authentication enabler 140 may utilize KS_NAF 1222 to decrypt and validate PIN 1232, as indicated by reference number 1238. If both the GBA and PIN authentications are successful, authentication enabler 140 may create a success API response, as indicated by reference number 1240. Authentication enabler 140 may provide a success API response 1242 to application server 130, and application server 130 may permit the user, via user device 110, to use the application, as indicated by reference number 1244.

Although FIGS. 12A-12C show example components of network portion 1200, in other implementations, network portion 1200 may include fewer components, different components, differently arranged components, or additional components than depicted in FIGS. 12A-12C. Alternatively, or additionally, one or more components of network portion 1200 may perform one or more other tasks described as being performed by one or more other components of network portion 1200.

FIGS. 13 and 14 are flow charts of an example process 1300 for authenticating a user device, an end user, and/or an application according to an implementation described herein. In one implementation, process 1300 may be performed by authentication enabler 140. Alternatively, or additionally, some or all of process 1300 may be performed by another device or group of devices, including or excluding authentication enabler 140.

As shown in FIG. 13, process 1300 may include receiving a request to authenticate a user device and/or an end user to use an application based on an application identifier and/or a user identifier (block 1310). For example, in an implementation described above in connection with FIG. 5, an end user, via user device 110, may invoke the use of an application provided by application server 130, as indicated by reference number 510. Based on requested use 510 of the application, application server 130 may generate request 520 to use authentication services provided by authentication enabler 140. Request 520 may include a request for authentication of the end user of user device 110, and may specify a type of authentication requested, an application identifier, and an identifier for the end user (e.g., a user identifier). Application server 130 may provide request 520 to gateway 120, and gateway 120 may evaluate request 520 and provide request 530 to authentication enabler 140. Request 530 may include the features of request 520, but may also include information obtained from the evaluation of request 520, such as an authentication required by request 520. Authentication enabler 140 may receive request 530.

As further shown in FIG. 13, process 1300 may include authenticating the application based on the application identifier (block 1320), and mapping the user identifier to a different identifier for authentication (block 1330). For example, in an implementation described above in connection with FIG. 5, authentication enabler 140 may authenticate the application if the application is trusted. The application may include registered credentials for application authentication and/or other data for authentication. If the application is trusted, authentication enabler 140 may further process request 530. For example, authentication enabler 140 may map the user identifier, provided in request 530, to one or more different identifiers based on data provided by the application service provider or by another entity, carrier data required for GBA authentication, and/or other data used for authentication. In one example, if request 530 includes a mobile phone number for the user identifier, authentication enabler 140 may map the mobile phone number to a unique identifier (e.g., "V098022") provided by the application service provider.

Returning to FIG. 13, process 1300 may include determining whether the application is registered for PIN authentication (block 1340). If the application is not registered for PIN authentication (block 1340—UNREGISTERED), process 1300 may include retrieving user credentials based on the user identifier or the different identifier (block 1350) and authenticating the user device and/or the end user using the requested authentication method (block 1360). For example, in an implementation described above in connection with FIG. 6, authentication enabler 140 may determine whether the application is registered for PIN authentication based on request 630. Authentication enabler 140 may retrieve credentials 640 associated with the end user, and for the requested authentication, from identity management database 150 and/or other devices/networks 160 based on the application identifier, the user identifier, and/or the mapped one or more different identifiers. Authentication enabler 140 may determine a type of authentication requested by request 630, and may perform the requested authentication. For example, if request 630 requests a GBA authentication, authentication enabler 140 may authenticate the end user and/or user device 110 using a GBA method that determines whether user device 110 is associated with the user identifier and that the association is valid and trusted.

As further shown in FIG. 13, if the application is registered for PIN authentication (block 1340—REGISTERED), process 1300 may include authenticating the user device using a GBA method, the user identifier, and/or the different identifier (block 1370) and securely retrieving, via a GBA key, a user PIN for authentication of the end user (block 1380). For example, in an implementation described above in connection with FIG. 7, authentication enabler 140 may authenticate user device 110 using a GBA method that determines whether user device 110 is associated with the user identifier and that the association is valid and trusted. The GBA method may result in shared key 760 being generated for authentication enabler 140 and authentication client 310, and authentication client 310 may store shared key 760. Shared key 760 may be used to protect (e.g., encrypt) information provided between authentication client 310 and authentication enabler 140. Authentication enabler 140 may securely (e.g., via encryption with the shared key 760) provide PIN request 765, to authentication client 310, which instructs authentication client 310 to request the end user's PIN and provides information about the application. Based on PIN request 765, the end user may provide information 770 (e.g., the end user's PIN 775) to authentication client 310, and authentication client 310 may securely (e.g., via encryption with the shared key 760) forward PIN 775 to authentication enabler 140. Authentication enabler 140 may authenticate the end user based on credentials 740, other communications 750, and/or PIN 775.

Returning to FIG. 13, process 1300 may include providing a success or a failure of the authentication of the application, the user device, and/or the end user to an application server hosting the application (block 1390). For example, in an implementation described above in connection with FIG. 7, based on the authentication of the end user and/or user device 110, authentication enabler 140 may generate response 780 that may include a success or a failure of the authentication and/or additional information related to the authentication. Authentication enabler 140 may provide response 780 to gateway 120, and gateway 120 may log the information provided in response 780 and may generate response 785. Response 785 may include the features of response 780. Gateway 120 may provide response 785 to application server 130, and application server 130 may determine whether the end user is authenticated for the application based on response 785. If response 785 indicates that the end user and user device 110 are authenticated, application server 130 may permit the end user, via user device 110, to use the application. If response 785 indicates that the end user or user device 110 is not authenticated, application server 130 may not permit the end user to use the application.

Process block 1360 may include the process blocks depicted in FIG. 14. As shown in FIG. 14, process block 1360 may include determining the requested authentication method based on the request (block 1400). If a GBA method is the requested authentication method (block 1400—GBA METHOD), process block 1360 may include authenticating the user device and/or the end user using the GBA method, the user identifier, and/or the different identifier (block 1410). For example, in an implementation described above in connection with FIG. 6, authentication enabler 140 may determine a type of authentication requested by request 630, and may perform the requested authentication. For example, if request 630 requests a GBA authentication, authentication enabler 140 may authenticate the end user and/or user device 110 using a GBA method that determines whether user device 110 is associated with the user identifier and that the association is valid and trusted.

As further shown in FIG. 14, if a PIN method is the requested authentication method (block 1400—PIN METHOD), process block 1360 may include retrieving a user PIN from the user device (block 1420) and authenticating the user device and/or the end user based on the user pin (block 1430). For example, in an implementation described above in connection with FIG. 6, if request 630 requests a PIN authentication, authentication enabler 140 may provide an authentication request 650, to authentication client 310, which instructs authentication client 310 to request the end user's PIN and provides information about the application. Based on authentication request 650, the end user may provide information 655 (e.g., the end user's PIN) to authentication client 310, and authentication client 310 may forward the PIN via a response 660 to authentication enabler 140. Authentication enabler 140 may authenticate the end user and/or user device 110 based on the PIN.

Returning to FIG. 14, if another method is the requested authentication method (block 1400—OTHER METHOD), process block 1360 may include authenticating the user device and/or the end user using the other method, the user identifier, and/or the different identifier (block 1440). For example, in an implementation described above in connection with FIG. 6, if request 630 requests other types of authentication methods, authentication enabler 140 may authenticate the end user and/or user device 110 using the other authentication methods provided by request 630.

Systems and/or methods described herein may provide application-initiated user authentication for applications provided by a cloud computing environment (e.g., by a service provider) and/or by a device, such as a mobile computation and/or communication device. The systems and/or methods may provide applications with a resilient user authentication mechanism, such as a user PIN. In one example implementation, a name or an identity of an application providing an authentication request may be used to determine how to access credentials for an authentication method required by the request. A user PIN may permit the application, requesting authentication, to authenticate a user of the application with a specific authentication request.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 13 and 14, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device and from an application server device hosting an application, a request to authenticate an end user of a user device to use the application, based on an application identifier and a user identifier included in the request;
   retrieving, by the device and responsive to the request, stored personal identification number (PIN) information corresponding to the user identifier;
   sending, by the device and responsive to the request, a message to the user device that triggers a generic bootstrapping architecture (GBA) authentication procedure and requests the end user to provide a PIN;
   determining, by the device, whether the application is authenticated based on the application identifier;
   determining, by another device and based on a response received from the user device wherein the request received from the user device includes a first digest calculated from a shared GBA key generated using the GBA authentication procedure, whether the first digest matches a second digest calculated by the other device from the shared GBA key;
   utilizing the shared GBA key to securely receive the PIN associated with the end user from the user device;
   determining, by the device and responsive to the matching of the first and second digests, whether the end user is authenticated based on a comparison of the stored PIN information and the PIN provided by the end user; and
   providing, by the device and to the application server device hosting the application, results of the authentications of the application, the user device, and the end user.

2. The method of claim 1, further comprising:
   mapping the user identifier to a different identifier; and
   determining whether the user device is authenticated based on the different identifier.

3. The method of claim 1, further comprising:
   retrieving credentials of the end user based on the user identifier; and
   determining whether the user device is authenticated based on the credentials of the end user and utilizing the GBA authentication procedure.

4. The method of claim 3, where the application identifier enables the device to determine how to retrieve the credentials of the end user.

5. The method of claim 1, where the results of the authentications of the application, the user device, and the end user indicate that the end user is or is not authenticated to use the application via the user device.

6. A non-transitory computer-readable medium, comprising:

one or more instructions that, when executed by at least one processor of one or more devices, cause the at least one processor to:
- receive, from an application server device hosting an application, a request to authenticate an end user of a user device to use the application, based on an application identifier and a user identifier included in the request,
- retrieve, responsive to the request, stored personal identification number (PIN) information corresponding to the user identifier,
- send, by the one or more devices and responsive to the request, a message to the user device that triggers a generic bootstrapping architecture (GBA) authentication procedure and requests the end user to provide a PIN,
- determine, based on a response received from the user device wherein the request received from the application server device includes a first digest calculated from a shared GBA key generated using the GBA authentication procedure, whether the first digest matches a second digest calculated by the at least one processor from the shared GBA key,
- utilize the shared GBA key to securely receive the PIN associated with the end user from the user device,
- determine, responsive to the matching of the first and second digests, whether the end user is authenticated based on a comparison of the stored PIN information and the PIN provided by the end user, and
- provide, to the application server device hosting the application, results of the authentications of the user device and the end user.

7. The non-transitory computer-readable medium of claim 6, further comprising:
one or more instructions that, when executed by the at least one processor, cause the at least one processor to:
determine whether the application is authenticated based on the application identifier.

8. The non-transitory computer-readable medium of claim 6, further comprising:
one or more instructions that, when executed by the at least one processor, cause the at least one processor to:
map the user identifier to a different identifier, and
determine whether the user device is authenticated based on the different identifier.

9. The non-transitory computer-readable medium of claim 6, further comprising:
one or more instructions that, when executed by the at least one processor, cause the at least one processor to:
retrieve credentials of the end user based on the user identifier, and
determine whether the user device is authenticated based on the credentials of the end user and utilizing the GBA authentication procedure.

10. The non-transitory computer-readable medium of claim 9, where the application identifier is used to determine how to retrieve the credentials of the end user.

11. The non-transitory computer-readable medium of claim 6, where the results of the authentications of the user device and the end user indicate that the end user is or is not authenticated to use the application via the user device.

12. A device comprising:
a memory storing instructions, and
a processor to execute the instructions to:
- receive, from an application server device hosting an application, a request to authenticate an end user of a user device to use the application, based on an application identifier and a user identifier included in the request,
- retrieve, responsive to the request, stored personal identification number (PIN) information corresponding to the user identifier,
- send, responsive to the request, a message to the user device that triggers a generic bootstrapping architecture (GBA) authentication procedure and requests the end user to provide a PIN,
- determine whether the application is authenticated based on the application identifier,
- retrieve, based on a response received from the user device wherein the request received from the application server device includes a first digest calculated from a shared GBA key generated using the GBA authentication procedure, whether the first digest received from and calculated by an authentication client using the shared GBA key matches a second digest calculated by another device from the shared GBA key,
- utilize the shared GBA key to securely receive the PIN associated with the end user from the user device,
- determine, responsive to the matching of the first and second digests, whether the end user is authenticated based on a comparison of the stored PIN information and the PIN provided by the end user; and
- provide, to the application server device, results of the authentications of the application, the user device, and the end user.

13. The device of claim 12, the processor further to execute the instructions to:
map the user identifier to a different identifier; and
determine whether the user device is authenticated based on the different identifier.

14. The device of claim 12, the processor further to execute the instructions to:
retrieve credentials of the end user based on the user identifier; and
determine whether the user device is authenticated based on the credentials of the end user and utilizing the GBA authentication procedure.

15. The device of claim 14, wherein the application identifier enables the processor to determine how to retrieve the credentials of the end user.

16. The device of claim 12, wherein results of the authentication of the end user indicate that the end user is or is not authenticated to use the application via the user device.

* * * * *